(12) United States Patent  
Lehtovirta et al.

(10) Patent No.: US 10,582,380 B2  
(45) Date of Patent: *Mar. 3, 2020

(54) METHODS AND APPARATUS FOR DIRECT COMMUNICATION KEY ESTABLISHMENT

(71) Applicant: TELEFONAKTIEBOLAGET LM ERICSSON (PUBL), Stockholm (SE)

(72) Inventors: Vesa Lehtovirta, Jorvas (FI); Monica Wifvesson, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 277 days.

This patent is subject to a terminal disclaimer.

(21) Appl. No.: 15/541,794

(22) PCT Filed: Nov. 17, 2015

(86) PCT No.: PCT/EP2015/076867  
§ 371 (c)(1),  
(2) Date: Jul. 6, 2017

(87) PCT Pub. No.: WO2016/116190  
PCT Pub. Date: Jul. 28, 2016

(65) Prior Publication Data  
US 2018/0279120 A1 Sep. 27, 2018

Related U.S. Application Data

(60) Provisional application No. 62/104,925, filed on Jan. 19, 2015.

(51) Int. Cl.  
H04W 12/04 (2009.01)  
H04L 29/06 (2006.01)  
(Continued)

(52) U.S. Cl.  
CPC ........... H04W 12/04 (2013.01); H04L 9/0838 (2013.01); H04L 9/0866 (2013.01); *H04W 76/14* (2018.02)

(58) Field of Classification Search  
None  
See application file for complete search history.

(56) References Cited

U.S. PATENT DOCUMENTS

2014/0351575 A1* 11/2014 Barriga ................. H04L 63/061  
713/155

FOREIGN PATENT DOCUMENTS

EP 2 785 011 A1 10/2014  
WO WO-2015065063 A1 * 5/2015 ........... H04L 9/0825

OTHER PUBLICATIONS

International Search Report and Written Opinion issued in Application No. PCT/EP2015/076867 dated Feb. 24, 2016, 12 pages.

(Continued)

Primary Examiner — Fatoumata Traore  
(74) Attorney, Agent, or Firm — Sage Patent Group

(57) ABSTRACT

Methods And Apparatus For Direct Communication Key Establishment Methods (100, 200, 300) and apparatus (400, 500, 600, 700, 800, 900) are disclosed for establishing a key for direct communication between a User Equipment device, UE, and a device. The methods and apparatus cooperate to form a system for securing direct communication between a UE and a device over an interface. The system comprises a UE (20), a device (30) and a Direct Communication Element (40). The Direct Communication Element (40) is configured to obtain a shared session key and Generic Bootstrapping Architecture Push Information, GPI, to derive a direct communication key from at least the shared session key, and to send the direct communication key and the GPI to the device (30). The device (30) is configured to send the GPI to the UE (20). The UE (20) is configured to derive the (Continued)

shared session key from at least the GPI and to derive the direct communication key from the shared session key. Also disclosed are a computer product operable to carry out methods according to the present invention and a computer program product comprising a computer readable medium having such a computer product stored thereon.

22 Claims, 18 Drawing Sheets

(51) Int. Cl.
*H04L 9/08* (2006.01)
*H04W 76/14* (2018.01)

(56) References Cited

OTHER PUBLICATIONS

3GPP TS 33.303 version 12.2.0 Release 12, Technical Specification; Universal Mobile Telecommunications System (UMTS); LTE; Proximity-based Services (ProSe); Security aspects, Jan. 2015, 67 pages.

3GPP TS 33.220 version 12.3.0 Release 12, 3rd Generation Partnership Project; Technical Specification Group Services and System Aspects; Generic Authentication Architecture (GAA); Generic Bootstrapping Architecture (GBA), Jun. 2014, 92 pages.

3GPP TS 33.259 version 12.0.0 Release 12, 3rd Generation Partnership Project; Technical Specification Group Services and System Aspects; Key establishment between a UICC Hosting Device and a Remote Device, Sep. 2014, 28 pages.

3GPP TS 23.303 version 12.3.0 Release 12, 3rd Generation Partnership Project; Technical Specification Group Services and System Aspects; Proximity-based services (ProSe); Stage 2, Dec. 2014, 62 pages.

Office Action for European Application No. 15798009.5, dated Nov. 20, 2018, 5 Pages.

"Digital cellular telecommunications system (phase 2+); Universal Mobile Telecommunications System (UMTS); LTE; Generic Authentication Architecture (GAA); Generic Bootstrapping Architecture (GBA) Push function (3GPP TS 33.223 version 12.0.0 Release 12)", Technical Specification, European Telecommunications Standards Intitute (ETSI), 650, Route Des Lucioles ; F-06921 Sophia-Antipolis ; France, vol. 3GPP SA 3, No. V12.0.0, Oct. 1, 2014 (Oct. 1, 2014).

* cited by examiner

METHODS AND APPARATUS FOR DIRECT COMMUNICATION KEY ESTABLISHMENT

CROSS REFERENCE TO RELATED APPLICATION(S)

This application is a 35 U.S.C. § 371 National Stage of International Patent Application No. PCT/EP2015/076867, filed Nov. 17, 2015, designating the United States and claiming priority to U.S. provisional application No. 62/104,925, filed on Jan. 19, 2015. The above identified applications are incorporated by reference.

TECHNICAL FIELD

The present invention relates to methods for establishing a key for direct communication between a User Equipment device, UE, and a device. The present invention also relates to a UE, a device and a Direct Communication Element, and to a computer program configured to carry out methods for establishing a key for direct communication between a UE and a device.

BACKGROUND

Direct communication involves establishing a radio connection between two devices without transiting via an access network of a cellular communication network. Direct communication may be used to establish communication between two User Equipment Devices (UEs) which may or may not be out of network coverage, or may enable one device to act as a relay for another device, providing access to network services to a device which is out of network coverage. In the $3^{rd}$ Generation Partnership Project (3GPP), direct communication is enabled via Proximity Services (ProSe), as set out in TS 33.303 and other standard documents. The following discussion focuses on 3GPP ProSe but is equally applicable to other direct communication technologies.

ProSe consists of two main elements: ProSe Direct Discovery, involving the network assisted discovery of users with a desire to communicate who are in close physical proximity, and ProSe Direct Communication, in which direct communication between such users is facilitated with or without supervision from the network. The ProSe direct communication path may use Evolved UMTS Terrestrial Radio Access (E-UTRA) or Wireless Local Area Network direct (WLAN direct) radio technology.

FIG. 1 illustrates a reference ProSe architecture, according to which two ProSe-enabled UEs 2 may establish a direct communication path between them. Communication between the devices takes place over the PC5 interface, with each device able to communicate with a ProSe Function 4 in the cellular network over the PC3 interface, and with a ProSe application server 6 over a PC1 interface. ProSe direct communication may also involve a ProSe "UE-to-Network Relay", according to which a device, which may itself be a UE, may act as a relay between the E-UTRAN and a UE which is out of the coverage area of the E-UTRAN. This arrangement is illustrated in FIG. 2, with remote UE 2 obtaining access to the E-UTRAN via ProSe direct communication with a ProSe UE-to-Network Relay 8. ProSe direct communication is particularly advantageous for public safety communication, providing communication services for the emergency services and other public safety bodies. The example of FIG. 2 illustrates the ProSe enabled remote UE 2 communicating with a Public Safety Application Server 10 via the E-UTRAN and EPC, which the remote UE 2 can access via ProSe direct communication with the ProSe UE-to-Network Relay 8.

In order to secure communication between two devices using ProSe Direct Communication, a shared key may be used when communicating over the PC5 interface. Standard procedure is to pre-configure appropriate shared keys into ProSe enabled devices. However, pre-configuring appropriate shared keys to enable ProSe Direct Communication with every other device that an enabled device may wish to communicate with may be extremely challenging. A single ProSe enabled UE may wish to communicate with a range of different ProSe enabled UEs, and with many different UE-to-Network Relays serving different cells within the network. In addition, two ProSe enabled UEs, or a UE and UE-to-Network Relay, wishing to communicate may be served by different Home PLMNs, or one or both devices may roam into a new PLMN, further complicating the task of pre-configuring shared keys. Pre-configuring shared keys in all of the relevant ProSe enabled devices to enable all of the possible communication paths that may be desired is therefore an extremely complex process.

SUMMARY

It is an aim of the present invention to provide methods, apparatus and computer readable media which at least partially address one or more of the challenges discussed above.

According to a first aspect of the present invention, there is provided a method performed by a User Equipment device, UE, for obtaining a key for direct communication with a device over an interface. The method comprises sending to the device an identifier of the UE and requesting key generation for direct communication with the device, receiving from the device a device identifier and key generation information, deriving a session shared key from at least the key generation information, and deriving a direct communication key from at least the session shared key and the identifier of the device.

In some examples, the method may be conducted with the UE out of coverage of coverage of a communication network, such as an E-UTRAN.

According to examples of the invention, the direct communication key may be derived using additional inputs to the session shared key and the device identifier, including for example the UE identifier or other suitable identifiers. In some examples, the direct communication key may be derived using a Key Derivation Function (KDF), and the input parameters may be hashed or otherwise processed before they are used to derive the direct communication key. The KDF can be any standard function such as the KDF defined in 3GPP TS 33.220.

According to examples of the invention, the device may be a UE, a UE-to-network Relay, or may be a network node. According to examples of the invention, the interface may comprise a Proximity Services, ProSe, interface. The ProSe interface may comprise a PC5 interface.

According to examples of the invention, the method may further comprise discovering the device through a discovery procedure.

According to examples of the invention, at least one of the UE identifier, the device identifier or the request for key generation may be comprised within a discovery procedure message.

According to examples of the invention, the method may further comprise receiving a discovery message from the device, wherein the discovery message includes the identifier of the device. The discovery message may be a Direct Discovery broadcast according to ProSe Model A or may be a Direct Discovery request message according to ProSe Model B.

According to examples of the invention, sending the identifier of the UE and requesting key generation for direct communication with the device may comprise sending a discovery response message responding to the received discovery message.

According to examples of the invention, the method may further comprise receiving a Message Authentication Code, MAC, with the device identifier and key generation information, wherein the MAC is generated using the direct communication key.

According to alternative examples, another key may be used to generate the MAC, for example a ProSe key used for ProSe direct discovery.

According to examples of the invention, the method may further comprise sending a first confirmation message to the device indicating that the UE has derived the direct communication key.

According to examples of the invention, the method may further comprise checking the received MAC with the derived direct communication key, generating a confirmation MAC using the direct communication key, and sending the confirmation MAC with the first confirmation message. If the check is successful, the first confirmation message may further indicate that the UE has successfully checked the MAC.

According to examples of the invention, the method may further comprise receiving a second confirmation message from the device.

According to examples of the invention, the device may comprise a UE-to-Network Relay and the UE may be out of coverage of a communication network.

According to examples of the invention, the key generation information may comprise Generic Bootstrapping Architecture Push Information, GPI.

According to another aspect of the present invention, there is provided a method performed by a device for obtaining a key for direct communication with a User Equipment device, UE, over an interface. The method comprises receiving from the UE an identifier of the UE and a request for key generation for direct communication with the device and sending to a Direct Communication Element the UE identifier and an identifier of the device, and requesting the Direct Communication Element to provide the device with a direct communication key. The method further comprises receiving from the Direct Communication Element the direct communication key and key generation information, and sending the key generation information and the device identifier to the UE.

According to examples of the invention, the device may be a UE, a UE-to-network Relay, or may be a network node.

According to examples of the invention, the Direct Communication Element may be a functional element hosted on a server or other processing element.

According to examples of the invention, the interface may comprise a Proximity Services, ProSe, interface, and the Direct Communication Element may comprise at least one of a ProSe Function or a ProSe KMS.

According to examples of the invention, the method may further comprise receiving from the UE an identifier of the Direct Communication Element. In some examples, the Direct Communication Element identifier may be contained within the UE identifier, for example as an indication of the Direct Communication Element with which the UE is associated.

According to examples of the invention, the method may further comprise discovering the UE through a discovery procedure.

According to examples of the invention, at least one of the UE identifier, the device identifier or the request for key generation may be comprised within a discovery procedure message.

According to examples of the invention, the method may further comprise sending a discovery message to the UE, wherein the discovery message includes the identifier of the device. According to some examples, the discovery message may be a Direct Discovery broadcast according to ProSe Model A or a Direct Discovery request message according to ProSe Model B.

According to examples of the invention, receiving from the UE an identifier of the UE and a request for key generation for direct communication with the device may comprise receiving a discovery response message responding to the sent discovery message.

According to examples of the invention, the method may further comprise generating a Message Authentication Code, MAC, using the direct communication key and sending the MAC to the UE with the key generation information and the device identifier. According to alternative examples, another key may be used to generate the MAC, for example a ProSe key used for ProSe direct discovery.

According to examples of the invention, the method may further comprise receiving a first confirmation message from the UE indicating that the UE has derived the direct communication key.

According to examples of the invention, the first confirmation message may further indicate that the UE has successfully checked the MAC.

According to examples of the invention, the method may further comprise receiving a confirmation MAC with the first confirmation message, wherein the confirmation MAC is generated using the direct communication key, checking the confirmation MAC using the direct communication key, and if the check is successful, seconding a second confirmation message to the UE.

According to examples of the invention, the device may comprise a UE-to-Network Relay.

According to examples of the invention, the key generation information may comprise Generic Bootstrapping Architecture Push Information, GPI.

According to examples of the invention, if the UE is comprised within a first communication network and the device is comprised within a second communication network, the Direct Communication Element may comprise a first sub-Element in the first communication network and a second sub-Element in the second communication network. In some examples, the first sub-Element may be a ProSe Function or ProSe KMS in a home PLMN of the UE and the second sub-Element may be a ProSe Function or ProSe KMS in a home PLMN of the device. A UE or device which is comprised within a communication network may for example comprise a UE or device which subscribes to the communication network.

According to examples of the invention, if the UE is comprised within a first communication network and the device is comprised within a second communication network, sending to and receiving from the Direct Communication Element may comprise sending to and receiving from the second sub-Element comprised within the second communication network.

According to another example of the present invention, there is provided a method, performed by a Direct Communication Element, for establishing a key for direct communication over an interface between a User Equipment device, UE, and a device. The method comprises receiving from the device an identifier of the UE, an identifier of the device and a request to provide a direct communication key to the device and sending the UE identifier to a Bootstrapping Server Function, BSF, associated with the UE and requesting key generation information from the BSF. The method further comprises receiving from the BSF a session shared key and key generation information, deriving the direct communication key from at least the session shared key and the device identifier, and sending the direct communication key and the key generation information to the device.

In some examples, a BSF that is associated with a UE may be a BSF that is contained within the same communication network as the UE, for example the same PLMN.

According to examples of the invention, the device may be a UE, a UE-to-network Relay, or may be a network node.

According to examples of the invention, the direct communication key may be derived using additional inputs to the session shared key and the device identifier, including for example, the UE identifier or other suitable identifiers. In some examples, the direct communication key may be derived using a Key Derivation Function (KDF), and the input parameters may be hashed or otherwise processed before they are used to derive the direct communication key. The KDF may be any standard function such as the KDF defined in 3GPP TS 33.220.

According to examples of the invention, the Direct Communication Element may be functional element hosted on a server or other processing element.

According to examples of the invention, the interface may comprise a Proximity Services, ProSe, interface, and the Direct Communication Element may comprise at least one of a ProSe Function or a ProSe KMS.

According to examples of the invention, the method may further comprise checking that at least one of the device or the UE is authorised to establish direct communication.

According to examples of the invention, the method may further comprise mapping the received UE identifier to a public UE identifier and sending the public UE identifier to the BSF.

According to examples of the invention, the device may comprise a UE-to-Network Relay.

According to examples of the invention, the key generation information may comprise Generic Bootstrapping Architecture Push Information, GPI.

According to examples of the invention, if the UE is comprised within a first communication network and the device is comprised within a second communication network, the Direct Communication Element may comprise a first sub-Element in the first communication network and a second sub-Element in the second communication network. In some examples, the first sub-Element may be a ProSe Function or ProSe KMS in a home PLMN of the UE and the second sub-Element may be a ProSe Function or ProSe KMS in a home PLMN of the device.

According to examples of the invention, if the UE is comprised within a first communication network and the device is comprised within a second communication network, checking that at least one of the device or the UE is authorised to establish direct communication may comprise checking that the UE is authorised to establish direct communication in the first sub-Element, and checking that the device is authorised to establish direct communication in the second sub-Element.

According to examples of the invention, if the UE is comprised within a first communication network and the device is comprised within a second communication network, sending to and receiving from at least one of the BSF or the device may comprise sending to and receiving from one of the first or second sub-Elements via the other of the first or second sub-Elements. In some examples, in which the sub-Elements comprise ProSe Functions in different PLMNs, the communication between sub-Elements may be over a PC6 interface.

According to examples of the invention, if the UE is comprised within a first communication network and the device is comprised within a second communication network, sending to and receiving from the BSF may comprise sending and receiving at the first sub-Element, and deriving the direct communication key may comprise deriving the direct communication key at the second sub-Element.

According to another aspect of the present invention, there is provided a computer program configured, when run on a computer, to carry out a method according to any one of the preceding aspects of the present invention.

According to another aspect of the present invention, there is provided a computer program product comprising computer readable medium and a computer program according to the preceding aspect of the present invention stored on the computer readable medium.

According to another aspect of the present invention, there is provided a system for securing direct communication between a User Equipment device, UE, and a device over an interface, the system comprising a UE, a device and a Direct Communication Element. The Direct Communication Element is configured to obtain a shared session key and Generic Bootstrapping Architecture Push Information, GPI, to derive a direct communication key from at least the shared session key, and to send the direct communication key and the GPI to the device. The device is configured to send the GPI to the UE. The UE is configured to derive the shared session key from at least the GPI and to derive the direct communication key from the shared session key.

According to examples of the invention, the Direct Communication Element and the UE may be configured to derive the direct communication key from the shared session key and an identifier of the device.

According to examples of the invention, the interface may comprise a Proximity Services, ProSe, interface, and the Direct Communication Element may comprise at least one of a ProSe Function or a ProSe Key Management Server, KMS.

According to another aspect of the present invention, there is provided a User Equipment device, UE, configured for obtaining a key for direct communication with a device over an interface, the UE comprising a processor and a memory, the memory containing instructions executable by the processor, such that the UE is operable to carry out a method according to the first aspect of the present invention.

According to another aspect of the present invention, there is provided a device configured for obtaining a key for direct communication with a User Equipment device, UE, over an interface, the device comprising a processor and a memory, the memory containing instructions executable by the processor, such that the device is operable to carry out a method according to the second aspect of the present invention.

According to another aspect of the present invention, there is provided a Direct Communication Element configured for establishing a key for direct communication over an interface between a User Equipment device, UE, and a device, the Direct Communication Element comprising a processor and a memory, the memory containing instructions executable by the processor, such that the Direct Communication Element is operable to carry out a method according to the third aspect of the present invention.

BRIEF DESCRIPTION OF THE DRAWINGS

For a better understanding of the present invention, and to show more clearly how it may be carried into effect, reference will now be made, by way of example, to the following drawings in which.

DETAILED DESCRIPTION

As discussed in the introduction, in order to secure communication between two devices using ProSe Direct Communication, a shared key may be used when communicating over the PC5 interface. Standard procedure is to pre-configure appropriate shared keys into ProSe enabled devices. However, pre-configuring appropriate shared keys to enable ProSe Direct Communication with every other device that an enabled device may wish to communicate with may be extremely challenging. A single ProSe enabled UE may wish to communicate with a range of different ProSe enabled UEs, and with many different UE-to-Network Relays serving different cells within the network. In addition, two ProSe enabled UEs, or a UE and UE-to-Network Relay, wishing to communicate may be served by different Home PLMNs, or one or both devices may roam into a new PLMN, further complicating the task of pre-configuring shared keys. Pre-configuring shared keys in all of the relevant ProSe enabled devices to enable all of the possible communication paths that may be desired is therefore an extremely complex process.

Another option for key establishment is to use Generic Bootstrapping Architecture (GBA) procedures as disclosed in co-filed application number PCT/EP2015/050864. However, such procedures require the ProSe enabled UE to be within E-UTRAN coverage at least to perform initial bootstrapping procedures, after which the UE may move outside of network coverage. If the ProSe enabled UE is not within E-UTRAN coverage, or is unable to perform initial bootstrapping procedures while in E-UTRAN coverage, then pre-configuring shared keys, with the associated challenges discussed above, remains the only option.

Aspects of the present invention provide methods enabling the establishment of a Direct Communication Key for securing communication between a UE and a device, which may itself be a UE or may be a UE-to-Network Relay. Aspects of the invention make use of the Generic Bootstrapping Architecture (GBA) Push procedure in 3GPP networks to assist in the establishing of the Direct Communication key for direct communication involving a UE which is out of E-UTRAN coverage.

Figure 1:
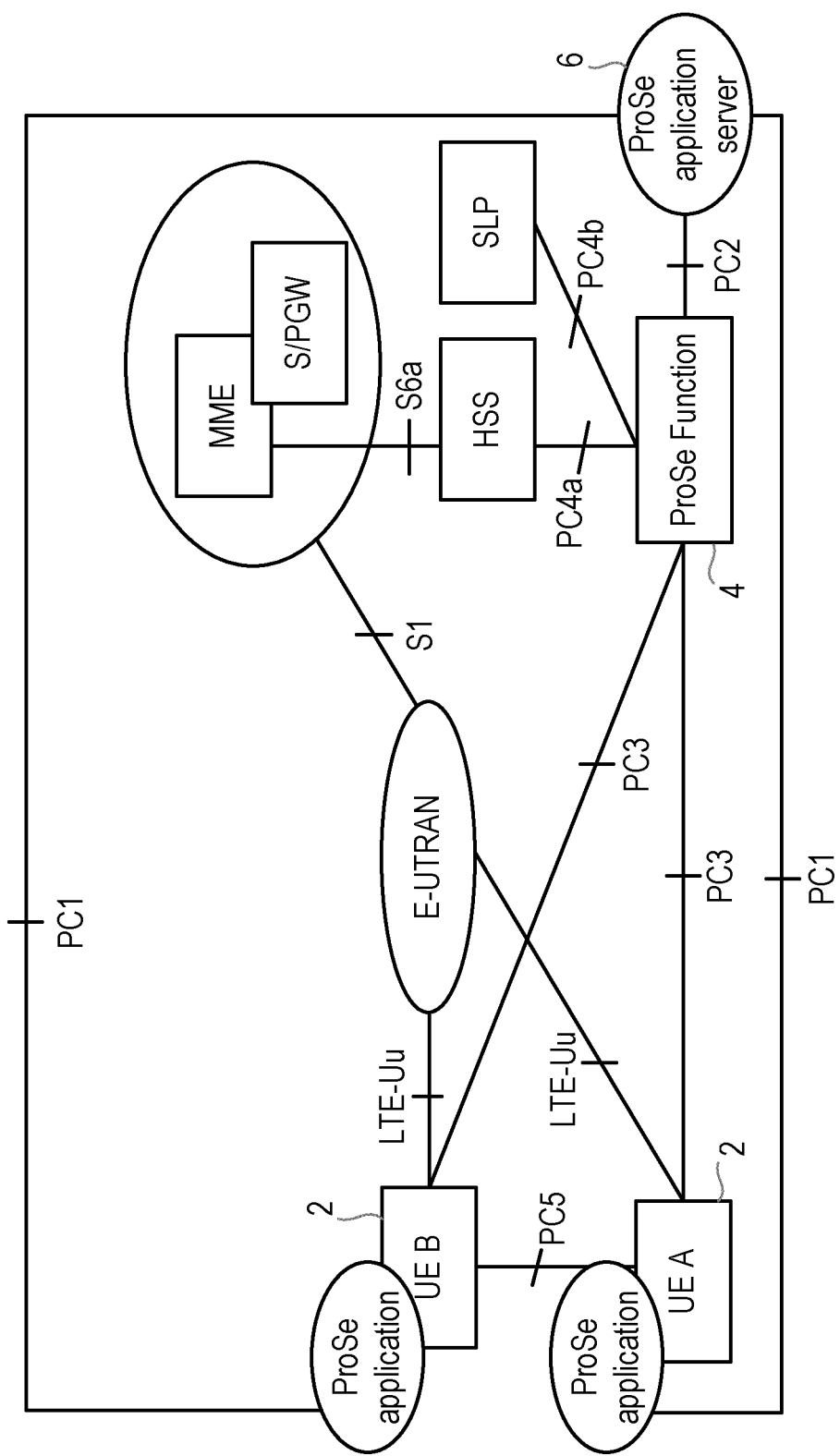
FIG. 1 is a schematic representation of a Proximity Services (ProSe) architecture.
Figure 2:
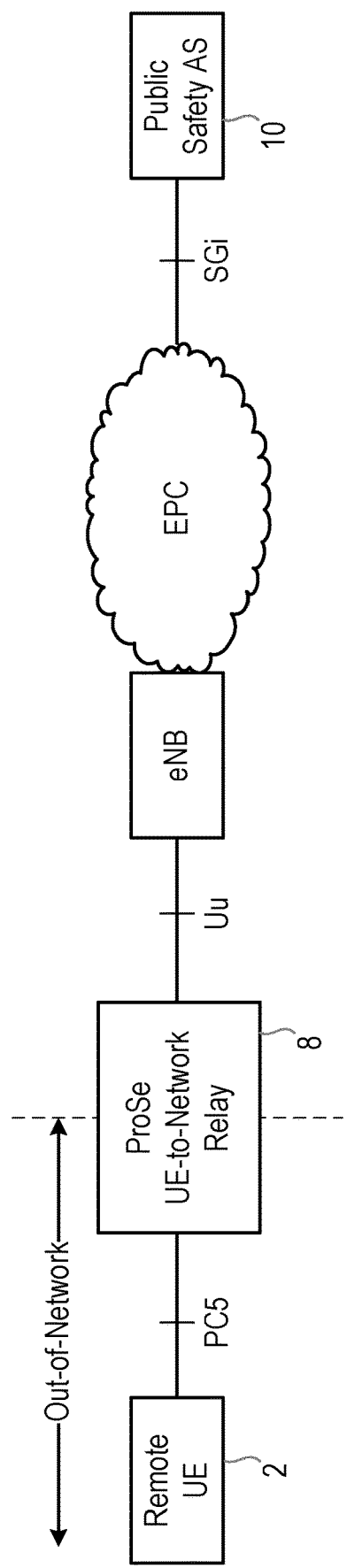
FIG. 2 is a representation of ProSe including a UE-to-Network Relay.
Figure 3:
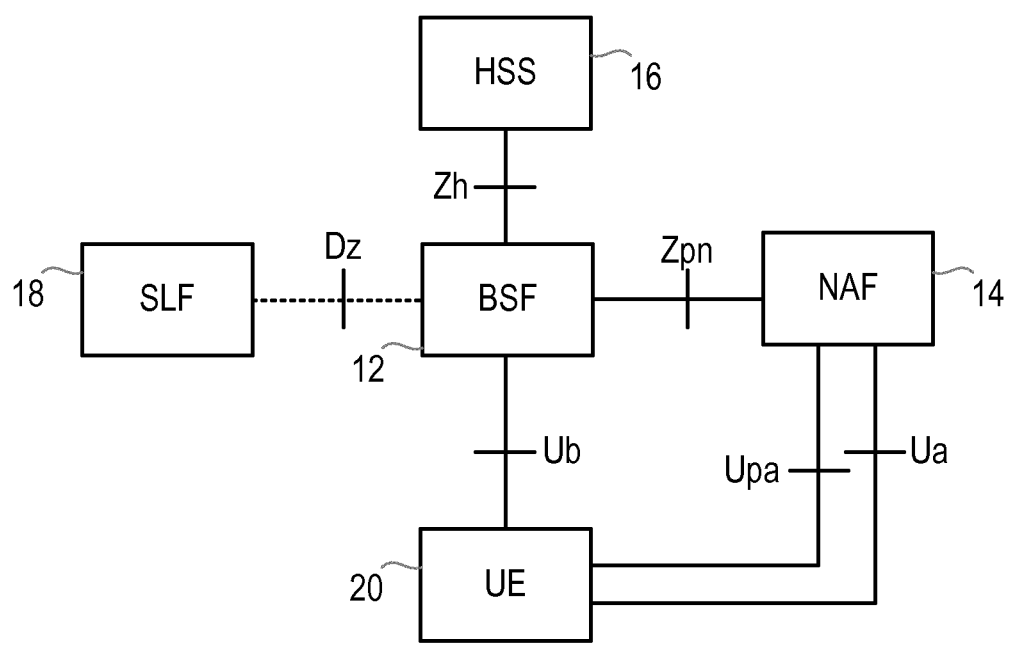
FIG. 3 a schematic representation of a Generic Bootstrapping Architecture (GBA) supporting a GBA Push function.

FIG. 3 illustrates a reference architecture for GBA Push. GBA Push is a mechanism to bootstrap the security between a Network Application Function (NAF) and a UE, without requiring the UE to contact a Bootstrapping Server Function (BSF) in the network to initiate the bootstrapping. GBA Push is closely related to GBA, as specified in TS 33.220. Referring to FIG. 3, the reference architecture comprises a UE 20, a Bootstrapping Server Function (BSF) 12, a Network Application Function (NAF) 14, a Home Subscription Server (HSS) 16 and a Subscriber Location Function (SLF) 18. A NAF 14 seeking to establish secure communication with a UE 20 registered for Push services requests information needed to establish a session shared key from the BSF 12. This information, known as GBA Push Information (GPI) is provided to the NAF 14 by the BSF 12 over the Zpn reference point, together with the session shared key. The NAF 14 stores the session shared key and forwards the GPI to the UE 20 over the Upa reference point. The UE 20 then processes the GPI to obtain the session shared key. The UE 20 and NAF 14 are then both in possession of the session shared key which may be used to secure communication over the Ua reference point.

Aspects of the present invention employ the reference GBA Push architecture, with enhanced functionality in the NAF, to establish a shared key between a UE and a device, which key may be used over a direct communication interface such as a ProSe PC5 interface. In brief, the UE contacts the device and indicates its identity. The UE may also indicate that GBA Push procedures should be used. The device contacts a Direct Communication Element, which may be a ProSe Function or Key Management Server (KMS), which then acts as a NAF for the purposes of GBA Push. The device indicates the UE identity received from the UE and its own identity to the NAF. The NAF contacts a BSF in the UE's home PLMN to retrieve GPI and a shared session key, or NAF key, Ks_NAF corresponding to the UE identity from the BSF. The NAF then derives a Direct Communication key K_DC from the NAF key and provisions both the Direct Communication key K_DC and the GPI to the device.

The device then sends the GPI and its own identity to the UE. The UE processes the GPI to obtain the session shared key or NAF specific key, which may for example be a Ks_NAF, Ks_int_NAF or Ks_ext_NAF. The UE then derives the Direct Communication key K_DC in the same manner as the NAF. The Direct Communication key K_DC is then available in both the UE and the device for use on a direct communication interface such as the ProSe PC5 interface between the UE and the device.

The NAF involved in the provisioning of the Direct Communication key may be operated by a 3GPP operator or a third party operator, for example a National Security or Public Safety organisation having an agreement with the 3GPP operator running the BSF. The device with which the UE communicates may be another UE or may be a UE-to-Network Relay.

Figure 4:
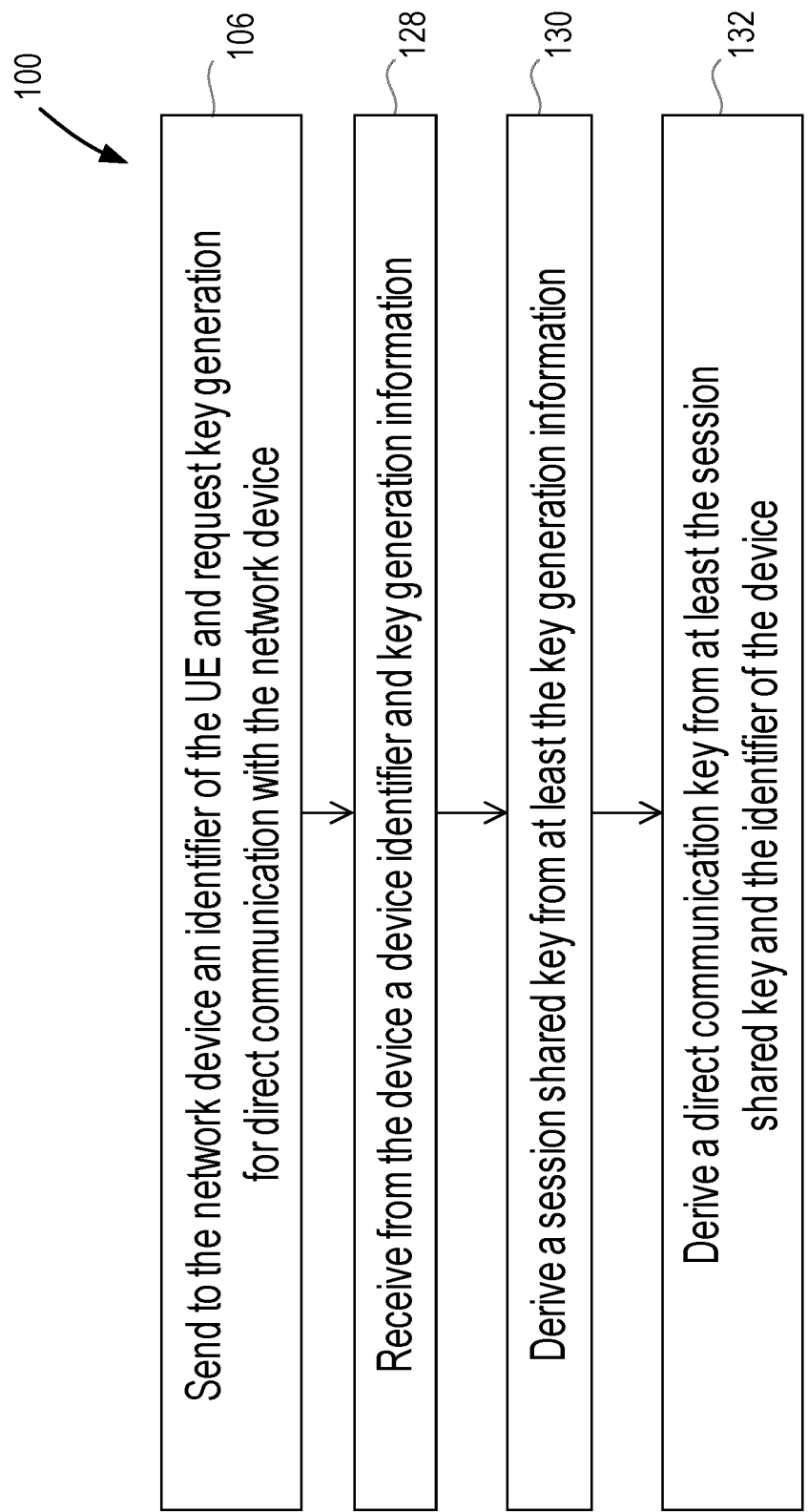
FIG. 4 is a flow chart illustrating process steps in a method performed by a UE for obtaining a key for direct communication with a device over an interface.
Figure 5:
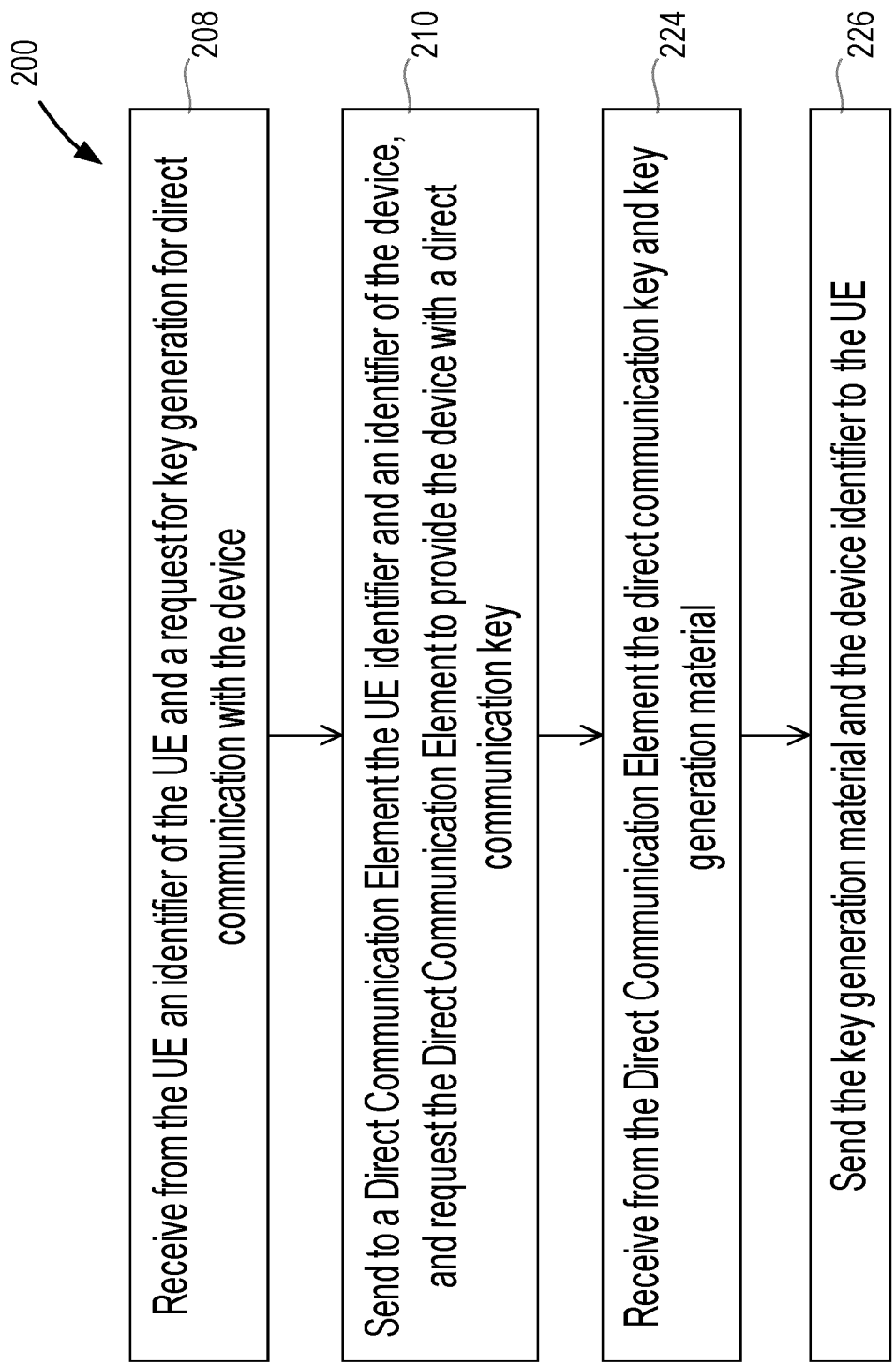
FIG. 5 is a flow chart illustrating process steps in a method performed by a device for obtaining a key for direct communication with a UE over an interface.
Figure 6:
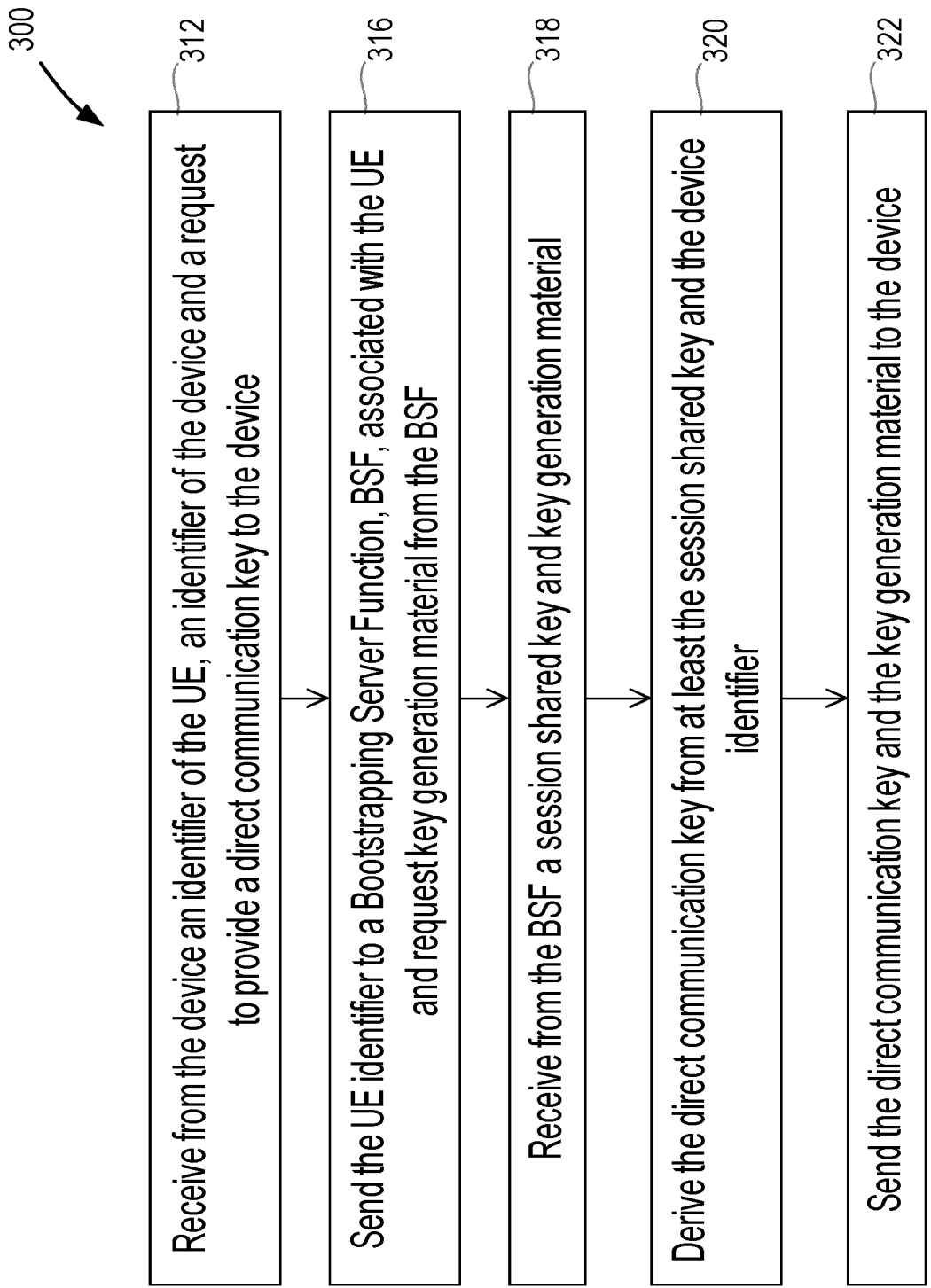
FIG. 6 is a flow chart illustrating process steps in a method performed by a Direct Communication Element for establishing a key for direct communication over an interface between a UE and a device.

FIGS. 4 to 6 illustrate methods according to aspects of the present invention performed in each of the UE, the device and the Direct Communication Element. Actions at each entity are described below with reference to FIGS. 4 to 6.

FIG. 4 illustrates steps in a method 100 carried out at a UE for obtaining a key for direct communication with a device, which device may be another UE or may be a UE-to-Network Relay. Referring to FIG. 4, in a first step 106, the UE sends to the device an identifier of the UE and requests key generation for direct communication with the device. In step 128, the UE receives from the device a device identifier and key generation information. The key generation information may for example be GBA Push Information, (GPI). The UE then derives a session shared key from at least the key generation information in step 130, and derives a direct communication key K_DC from at least the session shared key and the identifier of the device in step 132.

FIG. 5 illustrates steps in a method 200 performed by a device for obtaining a key for direct communication with a UE. The device may be a UE, a UE-to-network Relay, or may be network node. Referring to FIG. 5, in a first step 208, the device receives from the UE an identifier of the UE and a request for key generation for direct communication with the device. The device then sends to a Direct Communication Element the UE identifier and an identifier of the device, and requests the Direct Communication Element to provide the device with a direct communication key in step 210. The Direct Communication Element may for example be a ProSe Function or ProSe KMS. In step 224, the device receives from the Direct Communication Element the direct communication key and key generation information. Finally in step 226, the device sends the key generation information and the device identifier to the UE.

FIG. 6 illustrates steps in a method 300 performed by a Direct Communication Element (DCE) for establishing a key for direct communication over an interface between a UE and a device. The DCE may be a ProSe Function or a ProSe KMS, and the device may be a UE, a UE-to-network Relay, or a Network node. Referring to FIG. 6, in a first step 312, the DCE receives from the device an identifier of the UE, an identifier of the device and a request to provide a direct communication key to the device. The DCE then sends the UE identifier to a Bootstrapping Server Function (BSF) associated with the UE and requests key generation information from the BSF in step 316. In step 318, the DCE receives from the BSF a session shared key and key generation information. The DCE then derives the direct communication key K_DC from at least the session shared key and the device identifier in step 320 and sends the direct communication key and the key generation information to the device in step 322.

The step of deriving the direct communication key, performed in the UE according to method 100 and in the DCE according to method 300, may be achieved in a range of different ways. In some examples, the direct communication key may be derived using a Key Derivation Function (KDF), which may be any standard function such as the KDF defined in 3GPP TS 33.220. Additional parameters to the session shared key and the device ID mentioned above may be input to the KDF. Example additional input parameters include B-TID, NAF-ID, KMS-ID, ProSe UE-ID, CK∥IK and other inputs. The order of the input parameters may also be varied. The selection of additional parameters and the variation in their order may in some examples result in a more secure generation function. In addition, the input parameters may be transformed, hashed or otherwise processed before they are input to the KDF to derive the direct communication key. For example, a Ks_NAF could be transformed by first being run through another (or the same) key derivation function and the result input to the KDF, or another character sting could be used as input. In the following description, references to the derivation of a direct communication key include the above disclosed options for additional inputs and KDFs.

Figure 7:
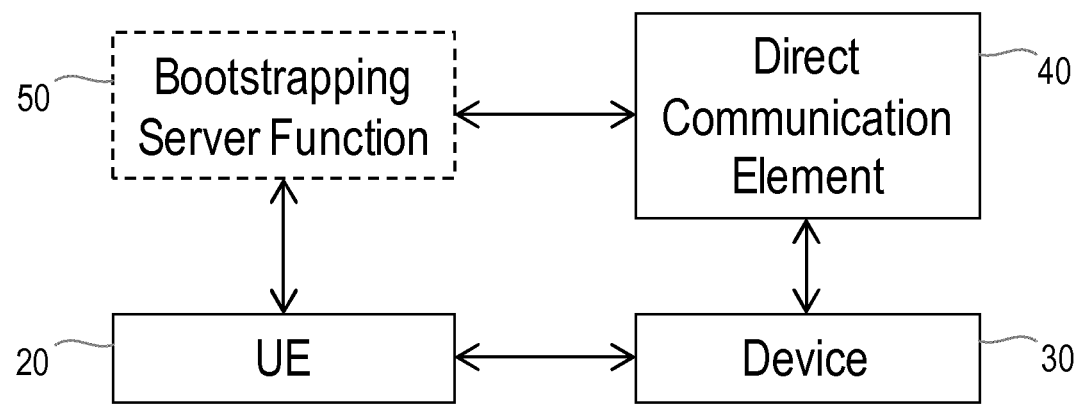
FIG. 7 is a schematic representation of a system for securing direct communication between a User Equipment device, UE, and a device over an interface.

The above described methods 100, 200, 300 may be performed by elements cooperating to form a system for securing direct communication between a UE and a device over an interface. Such a system is illustrated in FIG. 7 and comprises a UE 20, a device 30 and a Direct Communication Element (DCE) 40. The DCE 40 is configured to obtain a shared session key and Generic Bootstrapping Architecture Push Information, GPI, to derive a direct communication key from at least the shared session key, and to send the direct communication key and the GPI to the device 30. The device 30 is configured to send the GPI to the UE 20. The UE 20 is configured to derive the shared session key from at least the GPI and to derive the direct communication key from the shared session key.

The following discussion illustrates further examples of the invention with reference to ProSe communication as supported by a 3GPP network. However it will be appreciated that the invention is equally applicable to other direct communication technologies.

As discussed above, the device 30, at which the method 200 is performed, may be a UE, a UE-to-network Relay, or may be network node. Aspects of the invention are particularly suited to establishing a shared key for use by a UE which is out of network coverage. However, such a remote UE may use direct communication protocols to communicate not only with a dedicated UE-to-Network Relay but also with a direct communication enabled UE which may act as a UE-to-Network Relay. In addition, aspects of the present invention may be applied to establish a shared key for use by a UE which is within network coverage. It will therefore be appreciated that while a device in the form of a UE-to-Network Relay is discussed in the following examples for the purposes of illustration, aspects of the invention are applicable to use for key establishment between a UE and other forms of device, for example a device in the form of a second UE. In either case it is assumed that both the UE and the device have a UICC and are enabled for ProSe.

Regardless of the nature of the device, it is possible that the UE and device may belong to the same Home PLMN or may be belong to different Home PLMNs. Example applications of methods according to the present invention are described below for both these scenarios. The following example applications illustrate different ways in which the steps of the methods 100, 200, 300 described above may be implemented to achieve the above discussed functionality.

Example i) UE and Device in Same HPLMN

Figure 8:
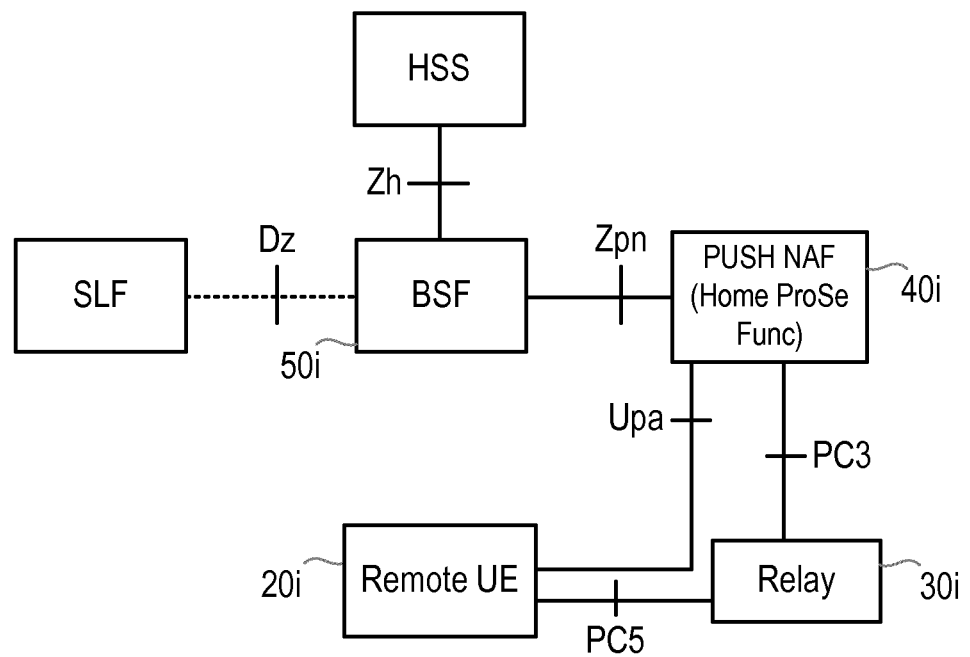
FIG. 8 is a representation of an example architecture for conducting the methods of FIGS. 4 to 6.
Figure 9:
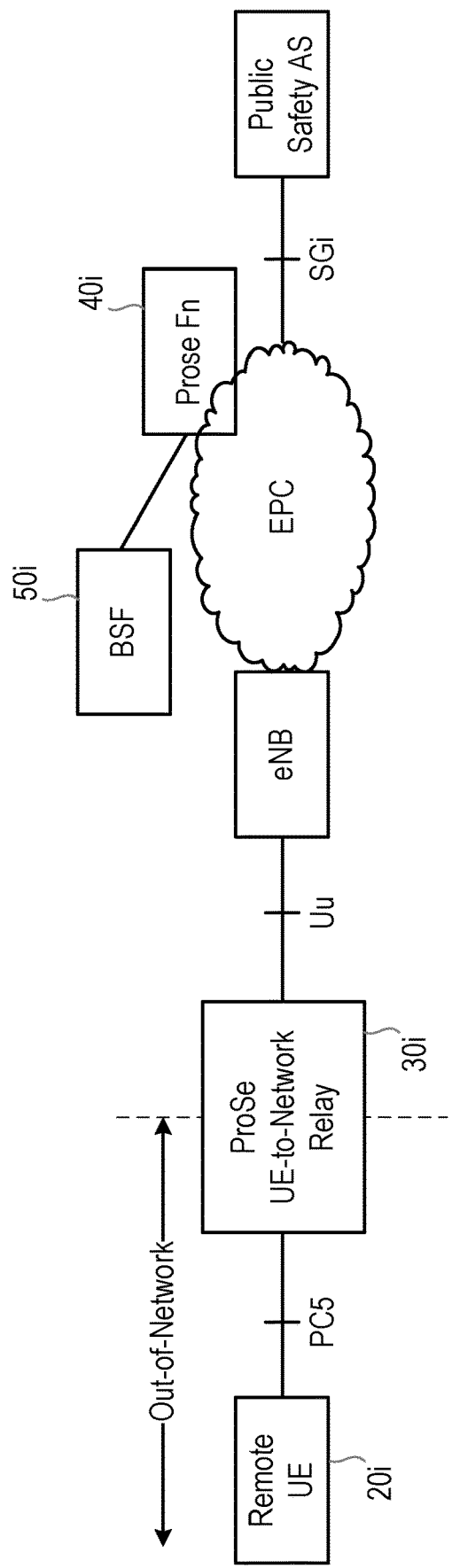
FIG. 9 is a representation of an example architecture for conducting the methods of FIGS. 4 to 6 over ProSe.

The GBA Push and ProSe architecture for this example are illustrated in FIGS. 8 and 9. According to this example, the UE, referred to as Remote UE 20$i$, and the device, referred to as Relay 30$i$, both belong to the same Home PLMN. The Relay 30$i$ has E-UTRAN network coverage and is connected to the network. The Relay 30$i$ is using ProSe Direct Discovery procedures to allow UEs in the vicinity to discover it. The Remote UE 20$i$ discovers the Relay 30$i$ using ProSe Direct Discovery procedures on the PC5 interface, for example having moved into the cell in which the Relay 30$i$ is located. In some examples of the invention, discovery may be completed before the methods according to the present invention are carried out. In other examples, certain method steps may take place during the discovery procedure.

The Remote UE 20$i$ sends its identity to the Relay 30$i$ and requests a direct communication key for use with the Relay 30$i$. On receipt of this request, the Relay 30$i$ sends a request over the PC3 interface to a DCE 40$i$, which in the present example comprises the ProSe Function in the Home PLMN of both the Remote UE 20$i$ and the Relay 30$i$, which ProSe Function acts as a NAF 40$i$ for GBA Push. The NAF 40$i$ obtains GBA Push Information (GPI) and a shared session key from the BSF 50$i$ in the Home PLMN. The session shared key is referred to in the present and following examples as a Ks_NAF for the purposes of illustration. However it will be appreciated that the session shared key may also or alternatively comprise other NAF specific keys such as Ks_int_NAF and Ks_ext_NAF. The NAF 40$i$ then derives the required direct communication key, K_UE2NW, from the shared session key Ks_NAF and the identity of the Relay 30$i$. The NAF 40$i$ then sends both the GPI and the direct communication key K_UE2NW to the Relay 30$i$. The Relay 30$i$ stores the direct communication key K_UE2NW and forwards the GPI to the Remote UE 20$i$. On receipt of the GPI, the Remote UE 20$i$ derives the shared session key Ks_NAF from the GPI and then derives the direct communication key K_UE2NW from the shared session key Ks_NAF and the identity of the Relay 30$i$. The direct communication key K_UE2NW is then available in both the Remote UE 20$i$ and the Relay 30$i$.

The above steps are described in greater detail below with reference to the messaging flow diagram in FIG. 10.

Figure 10:
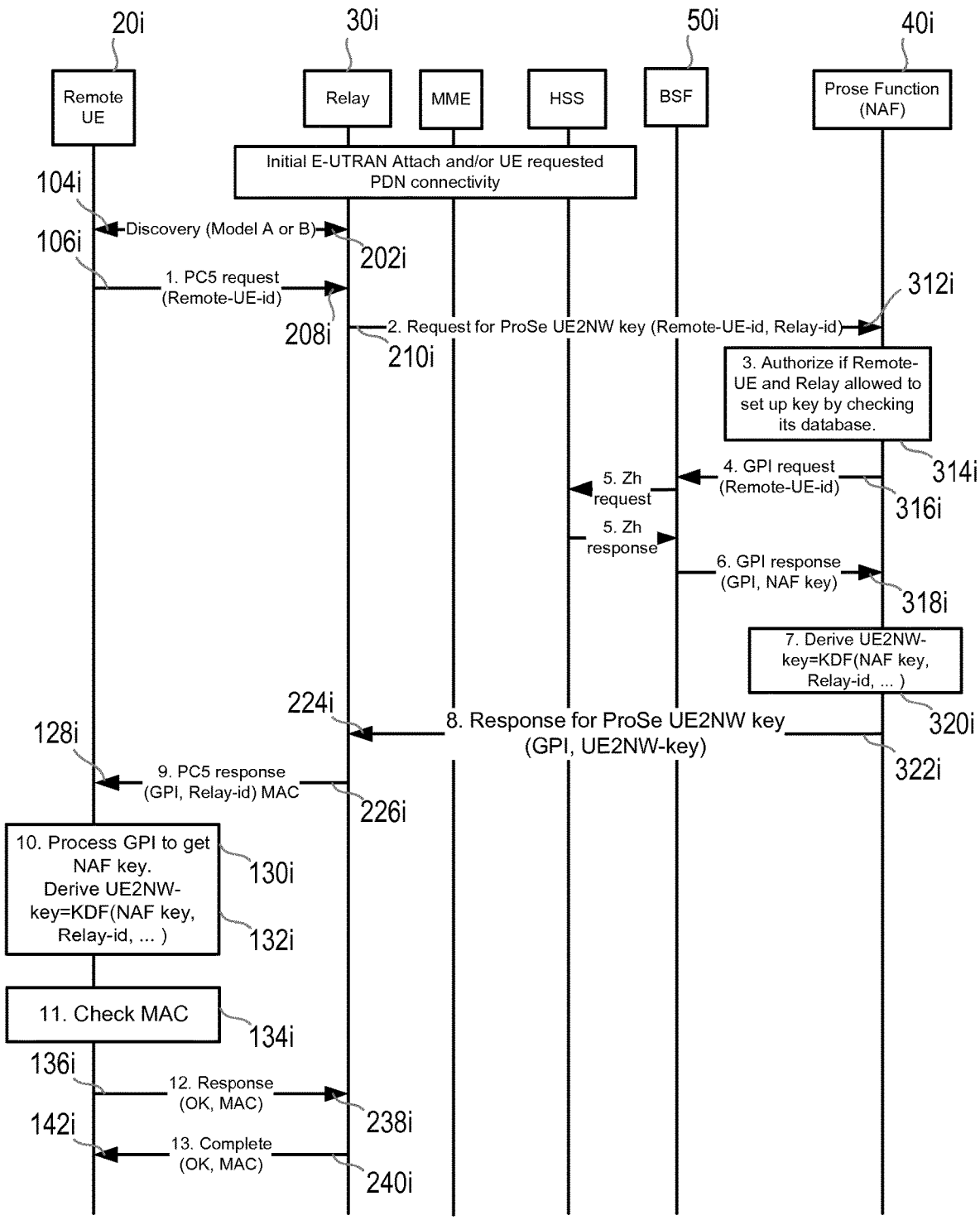
FIG. 10 is a message flow illustrating an example implementation of the methods of FIGS. 4 to 6 over ProSe.

Referring to FIG. 10, Relay 30$i$ initially connects to the E-UTRAN, which connection may take place at any time before the following method steps. The Remote UE 20$i$ and Relay 30$i$ then discover each other through Direct Discovery procedures using Direct Discovery Model A or Direct Discovery Model B.

Discovery may be initiated by either the Remote UE 20$i$ or the Relay 30$i$. In the illustrated example, discovery is initiated by the Relay 30$i$. In step 202$i$, the Relay 30$i$ issues a discovery message, which may be a Direct Discovery broadcast according to ProSe Model A or a Direct Discovery request message according to ProSe Model B. The discovery message includes an identity the Relay 30$i$. The Remote UE 20$i$ receives the discovery message at step 104$i$ and may respond, for example with a request message sent in response to a Direct Discovery broadcast according to ProSe Model A or with a Direct Discovery response message in response to a Direct Discovery request message according to ProSe Model B. In the illustrated example, the discovery procedure is completed before the subsequent method steps. However, in alternative examples, subsequent method steps may be combined with the discovery procedure, as discussed below.

In step 106$i$ (message exchange 1), the Remote UE 20$i$ sends a request message over PC5 to the Relay 30$i$. The request includes an identity of the Remote UE 20$i$ and a request for secure communication. The request may explicitly request generation of a key for direct communication, or an indication that secure communication is required may be contained within the Remote UE identity. In some examples, the identity of the Remote UE 20$i$ may be routable, and as such may be used to find the correct ProSe Function to act as Push NAF, having the necessary UE credentials. The Remote UE 20$i$ identity may for example be in the form: UE-id@ProseFunction1.operator.com. In further examples, the Remote UE 20$i$ may send the address or FQDN of the correct ProSe function to the Relay 30$i$. In further examples, the Remote UE 20$i$ may send the address or FQDN of the correct BSF to the Relay 30$i$.

In some examples of the invention (not illustrated) the Remote UE 20$i$ identity and the request for key generation may be included in a discovery response message as discussed above.

The Relay 30$i$ receives the request from the Remote UE 20$i$ at step 208$i$ and then, at step 210$i$, the Relay sends a request over the PC3 interface to the appropriate ProSe Function acting as NAF 40$i$. In the present example, both the Remote UE 20$i$ and the Relay 30$i$ are in the same PLMN and so the ProSe Function is the Home ProSe Function for the Relay 30$i$. The request to the NAF includes the identity of the Remote UE 20$i$ and the identity of the Relay 30$i$ and requests the NAF to provide a key for direct communication between the Remote UE 20$i$ and the Relay 30$i$.

Upon receiving the request in step 312$i$, the NAF 40$i$ first checks whether or not the Remote UE 20$i$ and Relay 30$i$ are authorized to set up secure communication over the PC5 interface by checking a database with a list of authorized identities at step 314$i$ (message exchange 3). This database may be local and supported by the NAF 40$i$ or may be implemented in a different network server. If the check is successful, the process continues and the NAF 40$i$ sends a GPI request to the appropriate BSF 50$i$ in step 316$i$ (message exchange 4). The identity of the Remote UE 20$i$ is included in the message, as this identity will be used as the public identity to obtain the correct subscription and GPI according to the GBA push procedures defined in TS 33.223.

It may be possible that the Remote UE 20$i$ identity is a ProSe specific identity which cannot be used directly as the public identity for GBA push. In this case the NAF 40$i$ may map the Remote UE 20$i$ identity to a suitable public identity, for example using a table of identities, before forwarding the public identity to the BSF 50*i*.

The BSF 50*i* contacts the HSS to fetch appropriate authentication vectors and GBA User Security Settings (GUSS) in message exchange 5 according to TS 33.223. The BSF 50*i* prepares the GPI and shared session key Ks_NAF according to the GBA push procedures defined in TS 33.223 and sends the GPI and Ks_NAF to the NAF 40*i* in message exchange 6. The GPI and Ks_NAF are received at the NAF 40*i* in step 318*i*.

Upon receiving the GPI and Ks_NAF in step 318*i*, the NAF 40*i* derives the direct communication key K_UE2NW to be provisioned to the Relay 30*i*. The NAF 40*i* calculates the direct communication key K_UE2NW at step 320*i* (message exchange 7) from the shared session key Ks_NAF and the Relay 30*i* identity as follows:

$$K\_UE2NW = KDF(Ks\_NAF, Relay\ ID, \ldots)$$

As discussed above, KDF is a key derivation function having as inputs at least Ks_NAF and the Relay 30*i* identity. Additional inputs may be included such as the Remote UE identity, and processing of the inputs before inputting to the KDF may take place. The NAF 40*i* also generates a direct communication key identity to be associated with the newly derived direct communication key K_UE2NW.

In message exchange 8, the NAF sends the GPI and the direct communication key K_UE2NW to the Relay 30*i* over the PC3 interface. The GPI and K_UE2NW are sent by the NAF 40*i* in step 322*i* and received by the Relay 30*i* in step 224*i*. The NAF 40*i* may also send a lifetime of the direct communication key.

The Relay 30*i* stores the direct communication key K_UE2NW and sends the GPI and the identity of the Relay 30*i* to the Remote UE 20*i* over the PC5 interface (message exchange 9). The Relay 30*i* may also send the lifetime of the direct communication key. The message is sent by the Relay 30*i* in step 226*i* and received at the Remote UE in step 128*i*. In the illustrated example, the message containing the GPI and the Relay 30*i* identity also contains a Message Authentication Code (MAC). The method 200 performed at the Relay may thus further comprise a step 225*i* of generating a MAC. The key used to generate the MAC may be the direct communication key K_UE2NW or may be some other ProSe key for example used for direct discovery.

Having received the GPI and Relay 30*i* identity, the Remote UE 20*i* derives the direct communication key K_UE2NW in message exchange 10. This comprises, in a first step 130*i*, processing the GPI to obtain the shared session key Ks_NAF before then deriving the direct communication key K_UE2NW from the shared session key Ks_NAF and the Relay 30*i* identity in step 132*i* in a similar manner to the NAF 40*i*. The Remote UE 20*i* thus calculates the direct communication key according to:

$$K\_UE2NW = KDF(Ks\_NAF, Relay\ ID, \ldots)$$

As discussed above, KDF is a key derivation function having as inputs at least Ks_NAF and UE-B ID (UE-to-NW Relay ID). Additional inputs may be included, and processing of the inputs before inputting to the KDF may take place.

In step 134*i* (message exchange 11), the Remote UE 20*i* checks the MAC received from the Relay 30*i* in step 128*i*. If the MAC was generated using the direct communication key, then the MAC may be checked by the Remote UE 20*i* using the direct communication key K_UE2NW, which the Remote UE 20*i* has just derived. If the MAC was generated using a different key, for example the key used for Direct Discovery, then that key may be used to check the MAC. If the check is successful, then the Remote UE 20*i* responds to the Relay 30*i* that the check was successful and protects the response with a MAC using K_UE2NW in message exchange 12. The response message is sent by the Remote UE 20*i* in step 136*i* and received by the Relay 30*i* at step 238*i*.

In step 240*i*, the Relay 30*i* checks the MAC received in step 238*i* using K_UE2NW. If the check is successful, then the Relay 30*i* knows that the Remote UE 20*i* shares the same direct communication key K_UE2NW as the Relay 30*i*. The Relay 30*i* can now use the direct communication key K_UE2NW for direct communication on the PC5 interface with the Remote UE 20*i*.

Mutual authentication may be included in the methods illustrated by the above described example in the following manner. Remote UE 20*i* and Relay 30*i* may generate nonces for mutual authentication: Remote UE 20*i* generates nonce-UE and Relay 30*i* generates nonce-Relay. A nonce may for example be a sequence number, a random value or a timestamp. Nonces may be exchanged in various messages of the above described example procedure. In one example, Remote UE 20*i* sends nonce-UE to Relay 30*i* with the request for secure communication sent in step 106*i*. Relay 30*i* takes nonce-UE as an input to its calculation of a MAC at step 225*i*, which MAC is sent to Remote UE 20*i* in step 226*i*. When Remote UE 20*i* verifies the MAC, this in practice means that Remote UE 20*i* authenticates the Relay 30*i*. An equivalent process allows authentication in the other direction. Relay 30*i* sends nonce-Relay to Remote UE 20*i* in step 226*i*. Remote UE 20*i* uses nonce-Relay as an input to its MAC calculation, which MAC is sent to the Relay 30*i* in step 136*i*. When Relay 30*i* verifies the MAC, this in practice means that Relay 30*i* authenticates Remote UE 20*i*.

Examples ii) and iii) UE and Device in Different HPLMNs

In examples in which the UE 20 and device 30 belong to different Home PLMNs, two scenarios may be envisaged:
1) The DCE of the device (Relay) acts as NAF for GBA Push
2) The DCE of the UE (Remote UE) acts as NAF for GBA Push In each scenario, the DCE may be the ProSe function of the relevant PLMN or may for example be a KMS of the relevant PLMN. In the following examples, the DCE is a ProSe function, but it will be appreciated that this is merely for the purposes of illustration. In some examples, the DCE may comprise a ProSe Function or KMS in each of the PLMNs, each Function or server acting as a sub-Element of the Direct Communication Element. For example, a ProSe Function in the Remote UE PLMN may act as a NAF for the bootstrapping procedure, as a first sub-Element, with a ProSe Function in the device PLMN delivering messages to and from the Relay, as a second sub-Element. Each ProSe Function may also authorize the entity (Remote UE or Relay) in its own PLMN.

Figure 11:
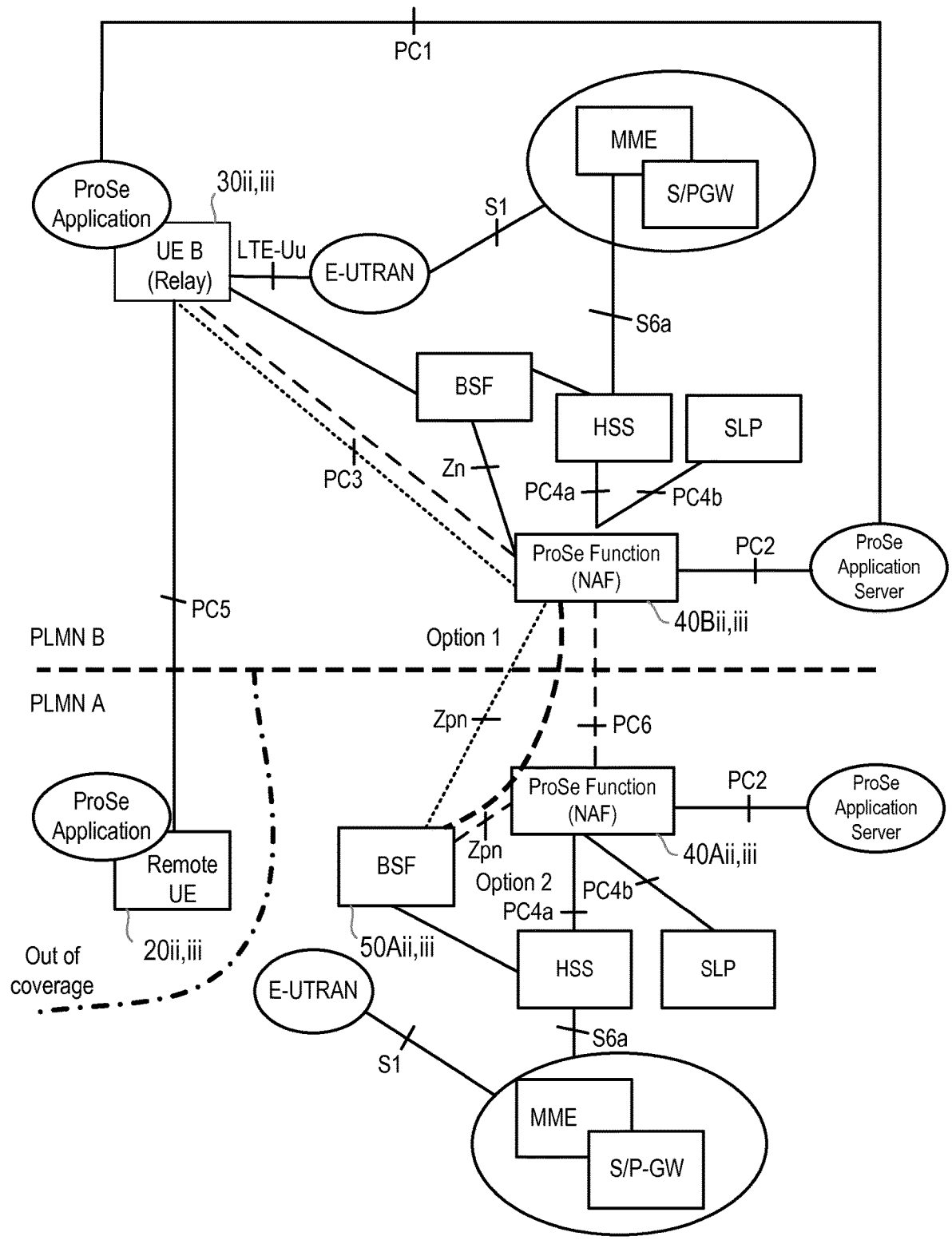
FIG. 11 is a representation of another example architecture for conducting the methods of FIGS. 4 to 6 over ProSe, wherein the UE and the device are comprised within different communication networks.

The ProSe architecture for Examples ii and iii is illustrated in FIG. 11. The PLMN of the UE 20 (Remote UE) is designated as PLMN A, with BSF 50A and ProSe Function 40A, which acts as NAF 40A according to option 2 (Example iii). The PLMN of the device 30 (Relay) is designated as PLMN B, with ProSe Function 40B, which acts as NAF 40B according to option 1 (Example ii). According to option 1 (dotted line), the Home ProSe Function of PLMN B, which acts as NAF 40B is the DCE conducting the steps of method 3. According to option 2 (dashed line), the DCE comprises two sub-Elements: the Home ProSe Function 40A of PLMN A, which acts as NAF 40A, and the Home ProSe Function 40B of PLMN B, which acts as a relay and shares the process of authorisation. The BSF of PLMN B is not involved in the following examples, as the GPI and shared session key are provided by the BSF of the UE Home PLMN, BSF 50A.

Example ii) UE and Device in Different HPLMNs and ProSe Function of the Device Acts as NAF This example is very similar to Example i described above. The procedure for Example ii is the same as that described with reference to FIG. 10 for Example i with the following differences (equivalent step numbering is used to that of Example i, with the suffix ii applied to refer to steps conducted according to Example ii).

In step 210*ii*, the Relay 30*ii* contacts its Home ProSe Function, which is acting as the NAF 40Bii. In contrast to Example i, this is not also the Home ProSe Function of the Remote UE 20*ii*, as the Remote UE 20*ii* and Relay 30*ii* are comprised within different PLMNs. The NAF 40Bii then contacts the BSF 50Aii of the Home PLMN of the Remote UE 20*ii* in order to obtain Ks_NAF and the GPI. This contact may be direct, or the NAF 40Bii may contact the BSF 50Aii using the ProSe Function 40Aii as a proxy or relay to convey messages.

Example iii) UE and Device in Different HPLMNs and ProSe Function of the UE Acts as NAF This example is also similar to Example i described above, with the exception that the ProSe Functions of two PLMNs are involved. The Prose Function of the UE acts as the NAF for GBA Push and the ProSe Function of the device acts as a proxy conveying messages and also contributes to the authorisation process.

Figure 12:
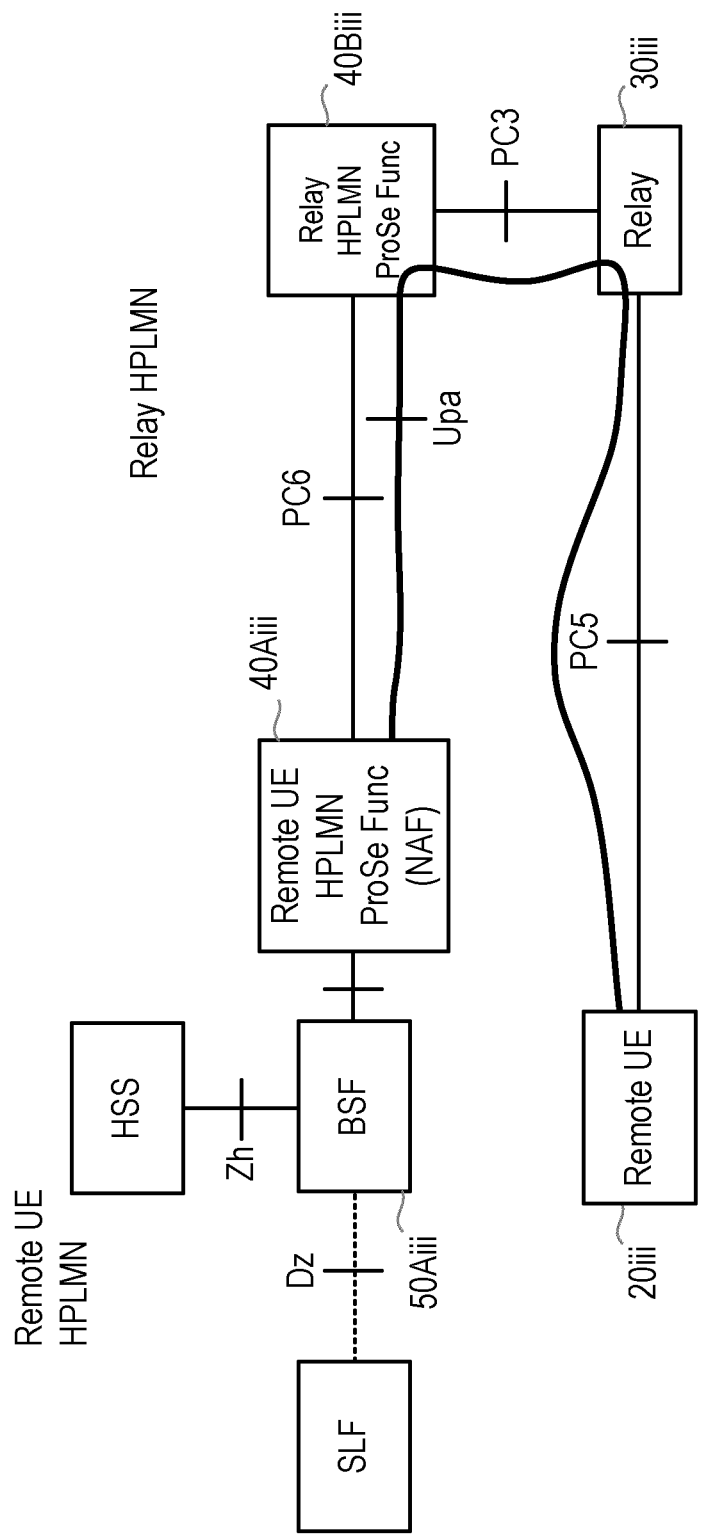
FIG. 12 is a representation of another example architecture for conducting the methods of FIGS. 4 to 6, wherein the UE and the device are comprised within different communication networks.

The GBA Push architecture for this example is illustrated in FIG. 12 and is illustrated as Option 2 in FIG. 11. According to this example, the UE, referred to as Remote UE 20*iii*, and the device, referred to as Relay 30*iii*, belong to different Home PLMNs. The Relay 30*iii* has E-UTRAN network coverage and is connected to the network. The Relay 30*iii* is using ProSe Direct Discovery procedures to allow UEs in the vicinity to discover it. The Remote UE 20*iii* discovers the Relay 30*iii* using ProSe Direct Discovery procedures on the PC5 interface, for example having moved into the cell in which the Relay 30*iii* is located. In some examples of the invention, discovery may be completed before the methods according to the present invention are carried out. In other examples, certain method steps may take place during the discovery procedure.

The Remote UE 20*iii* sends its identity to the Relay 30*iii* and requests a direct communication key for use with the Relay 30*iii*. On receipt of this request, the Relay 30*iii* sends a request over the PC3 interface to its own ProSe Function 40Biii, which is a sub-Element of the DCE 40 in this example. The Relay Home ProSe Function 40Biii passes the request to the ProSe Function in the PLMN of the Remote UE 40Aiii, which in the present example acts as a NAF 40Aiii for GBA Push. The NAF 40Aiii obtains GBA Push Information (GPI) and a shared session key Ks_NAF from the BSF 50Aiii in the Home PLMN of the Remote UE 20*iii*. The NAF 40Aiiii then derives the required direct communication key, K_UE2NW, from the shared session key Ks_NAF and the identity of the Relay 30*iii*. The NAF 40Aiii then sends both the GPI and the direct communication key K_UE2NW to the Home ProSe Function 40Biii of the Relay 30*iii*, which forwards the GPI and the direct communication key K_UE2NW to the Relay 30*iii*. The Relay 30*iii* stores the direct communication key K_UE2NW and forwards the GPI to the Remote UE 20*iii*. On receipt of the GPI, the Remote UE 20*iii* derives the shared session key Ks_NAF from the GPI and then derives the direct communication key K_UE2NW from the shared session key Ks_NAF and the identity of the Relay 30*iii*. The direct communication key K_UE2NW is then available in both the Remote UE 20*iii* and the Relay 30*iii*.

The above steps are described in greater detail below with reference to the messaging flow diagram in FIG. 13.

Figure 13:
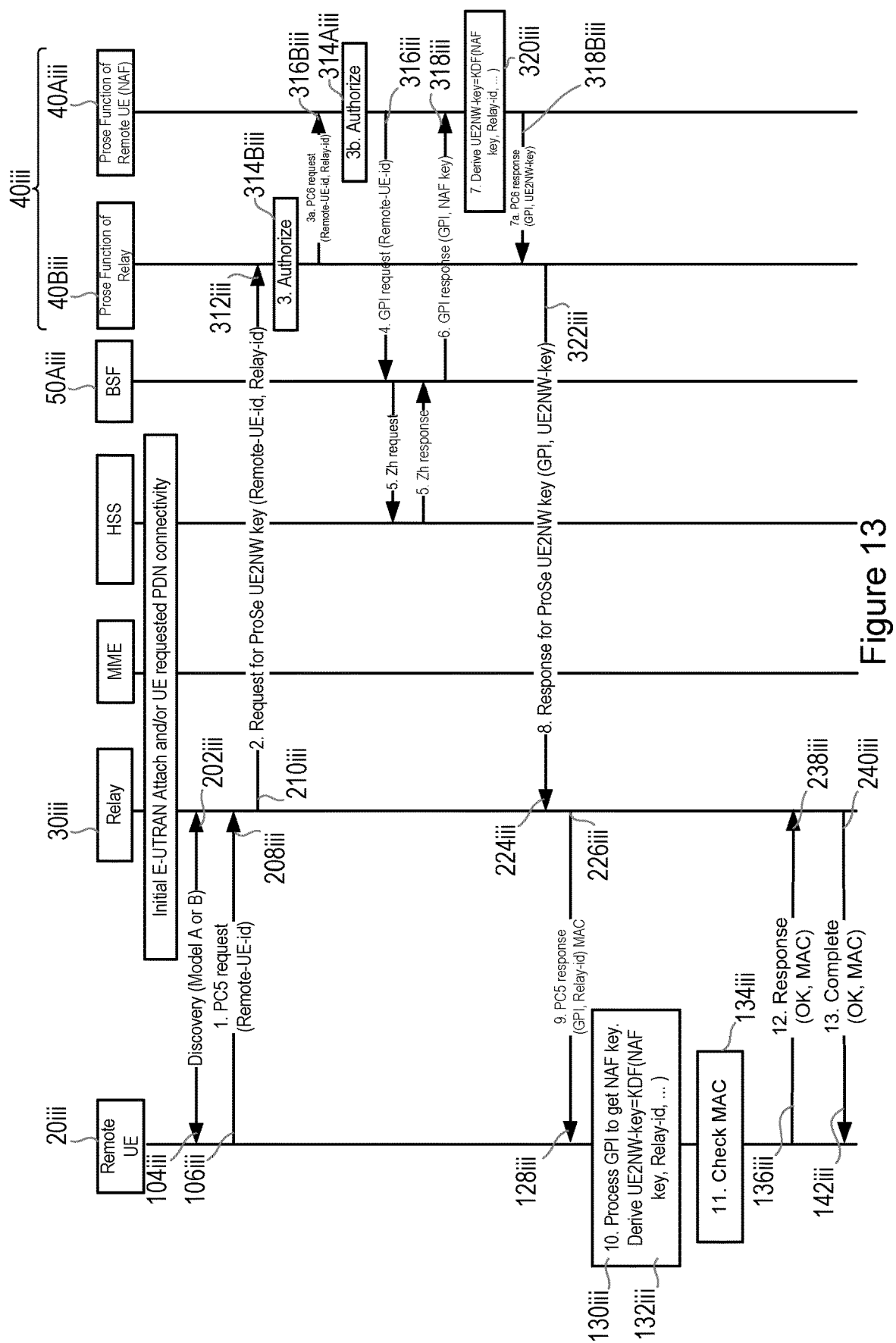
FIG. 13 is a message flow illustrating an example implementation of the methods of FIGS. 4 to 6 over ProSe.

Referring to FIG. 13, Relay 30*iii* initially connects to the E-UTRAN, which connection may take place at any time before the following method steps. The Remote UE 20*iii* and Relay 30*iii* then discover each other through Direct Discovery procedures using Direct Discovery Model A or Direct Discovery Model B.

Discovery may be initiated by either the Remote UE 20*iii* or the Relay 30*iii*. In the illustrated example, discovery is initiated by the Relay 30*iii*. In step 202*iii*, the Relay 30*iii* issues a discovery message, which may be a Direct Discovery broadcast according to ProSe Model A or a Direct Discovery request message according to ProSe Model B. The discovery message includes an identity the Relay 30*iii*. The Remote UE 20*iii* receives the discovery message at step 104*iii* and may respond, for example with a request message sent in response to a Direct Discovery broadcast according to ProSe Model A or with a Direct Discovery response message in response to a Direct Discovery request message according to ProSe Model B. In the illustrated example, the discovery procedure is completed before the subsequent method steps. However, in alternative examples, subsequent method steps may be combined with the discovery procedure, as discussed below.

In step 106*iii* (message exchange 1), the Remote UE 20*iii* sends a request message over PC5 to the Relay 30*iii*. The request includes an identity of the Remote UE 20*iii* and a request for secure communication. The request may explicitly request generation of a key for direct communication, or an indication that secure communication is required may be contained within the Remote UE identity. In some examples, the identity of the Remote UE 20*iii* may be routable, and as such may be used to find the correct ProSe Function to act as Push NAF, having the necessary UE credentials. The Remote UE 20*iii* identity may for example be in the form: UE-id@ProseFunction1.operator.com. In further examples, the Remote UE 20*iii* may send the address or FQDN of the correct ProSe function to the Relay 30*iii*. In still further examples, the Remote UE 20*iii* may send the address or FQDN of the correct BSF to the Relay 30*iii*.

In some examples of the invention (not illustrated) the Remote UE 20*iii* identity and the request for key generation may be included in a discovery response message as discussed above.

The Relay 30*iii* receives the request from the Remote UE 20*iii* at step 208*iii* and then, at step 210*iii*, the Relay sends a request over the PC3 interface to its own Home ProSe Function 40Biii. The request includes the identity of the Remote UE 20*iii* and the identity of the Relay 30*iii* and requests provision of a key for direct communication between the Remote UE 20*iii* and the Relay 30*iii*. The request may also include the address or FQDN of the correct BSF.

Upon receiving the request in step 312*iii*, the Home ProSe Function 40Biii of the Relay 30*iii* first checks whether or not the Relay 30*iii* is authorized to set up secure communication over the PC5 interface by checking a database with a list of authorized identities at step 314Biii (message exchange 3). This database may be local and supported by the ProSe Function 40Biii or may be implemented in a different network server. If the check is successful, the process continues and the ProSe Function 40Biii forwards the request to the Home ProSe Function 40Aiii of the Remote UE 20*iii*, which in the present example acts as the NAF 40Aiii, in step 316Biii (message exchange 3*a*). The message is forwarded over the PC6 interface and includes both the identity of the Remote UE 20*iii* and the identity of the Relay 30*iii*.

Upon receiving the request in step 316Biii, the NAF 40Aiii first checks whether or not the Remote UE 20*iii* is authorized to set up secure communication over the PC5 interface by checking a database with a list of authorized identities at step 314Aiii (message exchange 3*b*). This database may be local and supported by the NAF 40Aiii or may be implemented in a different network server. If the check is successful, the process continues and the NAF 40Aiii sends a GPI request to the BSF 50Aiii in step 316*iii* (message exchange 4). The identity of the Remote UE 20*iii* is included in the message, as this identity will be used as the public identity to obtain the correct subscription and GPI according to the GBA push procedures defined in TS 33.223.

It may be possible that the Remote UE 20*iii* identity is a ProSe specific identity which cannot be used directly as the public identity for GBA push. In this case the NAF 40Aiii may map the Remote UE 20*iii* identity to a suitable public identity, for example using a table of identities, before forwarding the public identity to the BSF 50Aiii.

The BSF 50Aiii contacts the HSS to fetch appropriate authentication vectors and GBA User Security Settings (GUSS) in message exchange 5 according to TS 33.223. The BSF 50Aiii prepares the GPI and shared session key Ks_NAF according to the GBA push procedures defined in TS 33.223 and sends the GPI and Ks_NAF to the NAF 40Aiii in message exchange 6. The GPI and Ks_NAF are received at the NAF 40Aiii in step 318*iii*.

Upon receiving the GPI and Ks_NAF in step 318*iii*, the NAF 40Aiii derives the direct communication key K_UE2NW to be provisioned to the Relay 30*iii*. The NAF 40Aiii calculates the direct communication key K_UE2NW at step 320*iii* (message exchange 7) from the shared session key Ks_NAF and the Relay 30*iii* identity as follows:

$$K\_UE2NW=KDF(Ks\_NAF,\text{Relay ID}, \ldots )$$

As discussed above, KDF is a key derivation function having as inputs at least Ks_NAF and the Relay 30*iii* identity. Additional inputs may be included such as the Remote UE identity, and processing of the inputs before inputting to the KDF may take place. The NAF 40Aiiii also generates a direct communication key identity to be associated with the newly derived direct communication key K_UE2NW.

In step 318Biii, the NAF sends the GPI and the derived direct communication key K_UE2NW to the Home ProSe Function 40Biii of the Relay 30*iii* (message exchange 7*a*) over the PC6 interface. The NAF may also send a lifetime of the direct communication key.

In message exchange 8, the Home ProSe Function 40Biii of the Relay 30*iii* sends the GPI and the direct communication key K_UE2NW to the Relay 30*iii* over the PC3 interface. The GPI and K_UE2NW are sent by the ProSe Function 40Biii in step 322*iii* and received by the Relay 30*iii* in step 224*iii*. The Home ProSe Function 40Biii of the Relay 30*iii* may also send the lifetime of the direct communication key.

The Relay 30*iii* stores the direct communication key K_UE2NW and sends the GPI and the identity of the Relay 30*iii* to the Remote UE 20*iii* over the PC5 interface (message exchange 9). The message is sent by the Relay 30*iii* in step 226*iii* and received at the Remote UE in step 128*iii*. The Relay 30*iii* may also send the lifetime of the direct communication key. In the illustrated example, the message containing the GPI and the Relay 30*iii* identity also contains a Message Authentication Code (MAC). The method 200 performed at the Relay 30*iii* may thus further comprise a step 225*iii* of generating a MAC. The key used to generate the MAC may be the direct communication key K_UE2NW or may be some other ProSe key for example used for direct discovery.

Having received the GPI and Relay 30*iii* identity, the Remote UE 20*iii* derives the direct communication key K_UE2NW in message exchange 10. This comprises, in a first step 130*iii*, processing the GPI to obtain the shared session key Ks_NAF before then deriving the direct communication key K_UE2NW from the shared session key Ks_NAF and the Relay 30*iii* identity in step 132*iii* in a similar manner to the NAF 40Aiii. The Remote UE 20*iii* thus calculates the direct communication key according to:

$$K\_UE2NW=KDF(Ks\_NAF,\text{Relay ID}, \ldots )$$

As discussed above, KDF is a key derivation function having as inputs at least Ks_NAF and UE-B ID (UE-to-NW Relay ID). Additional inputs may be included, and processing of the inputs before inputting to the KDF may take place.

In step 134*iii* (message exchange 11), the Remote UE 20*iii* checks the MAC received from the Relay 30*iii* in step 128*iii*. If the MAC was generated using the direct communication key, then the MAC may be checked by the Remote UE 20*iii* using the direct communication key K_UE2NW, which the Remote UE 20*iii* has just derived. If the MAC was generated using a different key, for example the key used for Direct Discovery, then that key may be used to check the MAC. If the check is successful, then the Remote UE 20*iii* responds to the Relay 30*iii* that the check was successful and protects the response with a MAC using K_UE2NW in message exchange 12. The response message is sent by the Remote UE 20*iii* in step 136*iii* and received by the Relay 30*iii* at step 238*iii*.

In step 240*iii*, the Relay 30*iii* checks the MAC received in step 238*iii* using K_UE2NW. If the check is successful, then the Relay 30*iii* knows that the Remote UE 20*iii* shares the same direct communication key K_UE2NW as the Relay 30*iii*. The Relay 30*iii* can now use the direct communication key K_UE2NW for direct communication on the PC5 interface with the Remote UE 20*iii*.

As in the previous examples, mutual authentication may be included in the methods illustrated by the above described example in the following manner. Remote UE 20*iii* and Relay 30*iii* may generate nonces for mutual authentication: Remote UE 20*iii* generates nonce-UE and Relay 30*iii* generates nonce-Relay. A nonce may for example be a sequence number, a random value or a timestamp. Nonces may be exchanged in various messages of the above described example procedure. In one example, Remote UE 20*iii* sends nonce-UE to Relay 30*iii* with the request for secure communication sent in step 106*iii*. Relay 30*iii* takes nonce-UE as an input to its calculation of a MAC at step 225*iii*, which MAC is sent to Remote UE 20*iii* in step 226*iii*. When Remote UE 20*iii* verifies the MAC, this in practice means that Remote UE 20*iii* authenticates the Relay 30*iii*. An equivalent process allows authentication in the other direction. Relay 30*iii* sends nonce-Relay to Remote UE 20*iii* in step 226*iii*. Remote UE 20*iii* uses nonce-Relay as an input to its MAC calculation, which MAC is sent to the Relay 30*iii* in step 136*iii*. When Relay 30*iii* verifies the MAC, this in practice means that Relay 30*iii* authenticates Remote UE 20*iii*.

Figure 14:
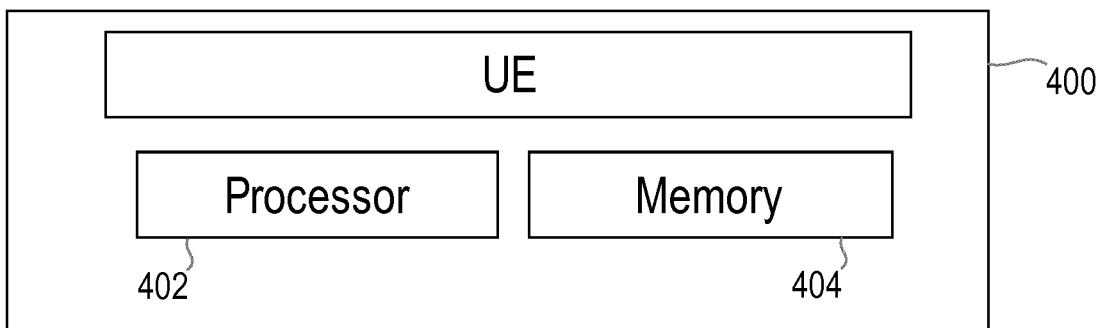
FIG. 14 is a block diagram illustrating a UE.
Figure 15:
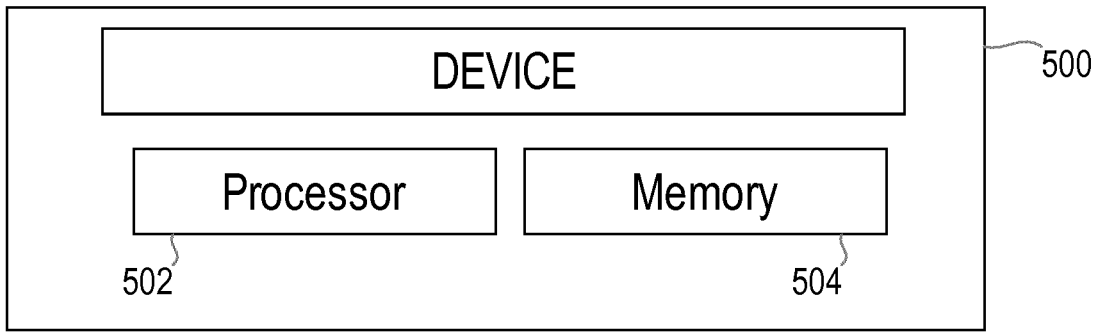
FIG. 15 is a block diagram illustrating a device.
Figure 16:
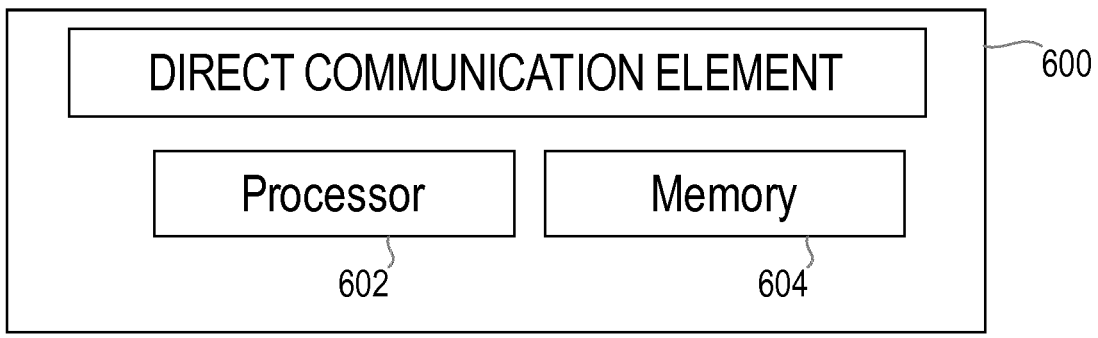
FIG. 16 is a block diagram illustrating a Direct Communication Element.

The methods of the present invention, as illustrated by the above examples, may be conducted in a UE, a device which may be a UE, a UE-to-network Relay, or a network node such, or a Direct Communication Element (DCE) such as a ProSe Function or a KMS. The methods may be conducted on receipt of suitable computer readable instructions, which may be embodied within a computer program running on the UE, device or DCE. FIGS. 14 to 16 illustrate first examples of a UE, device and DCE which may execute the methods of the present invention, for example on receipt of suitable instructions from a computer program. Referring to FIGS. 14 to 16, each of the UE 400, device 500 and DCE 600 comprises a processor 402, 502, 602 and a memory 404, 504, 604. The memory 404, 504, 604 contains instructions executable by the processor 402, 502, 602 such that the UE 400 is operative to carry out the method 100, the device 500 is operative to carry out the method 200 and the DCE 600 is operative to carry out the method 300.

Figure 17:
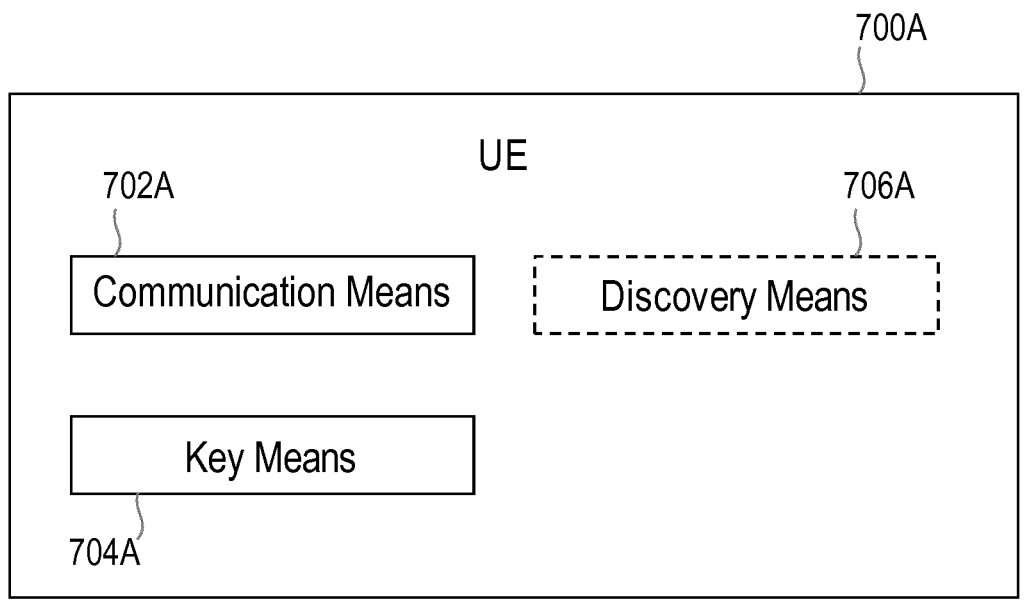
FIG. 17 is a block diagram illustrating another example of a UE.

FIG. 17 illustrates functional units in another embodiment of UE 700A which may execute the method 100, for example according to computer readable instructions received from a computer program. It will be understood that the units illustrated in FIG. 17 are software implemented functional units, and may be realised in any appropriate combination of software modules.

Referring to FIG. 17, the UE 700A comprises communication means 702A for sending to a device an identifier of the UE 700A and for requesting key generation for direct communication with the device. The communication means 702A also comprises means for receiving from the device a device identifier and key generation information. The UE 700A also comprises key means 704A for deriving a session shared key from at least the key generation information and for deriving a direct communication key from at least the session shared key and the identifier of the device.

The UE 700A may further comprise discovery means 706A for discovering the device through a discovery procedure. The communication means 702A may comprise means for receiving a discovery message from the device and for passing the message to the discovery means 704A, the discovery message including the identifier of the device. The communication means 702A may also comprise means for sending a discovery response message responding to the received discovery message, the discovery response message including identifier of the UE 700A and the request for key generation for direct communication and being assembled by the discovery means 706A.

The communication means 702A may further comprise means for sending a first confirmation message to the device indicating that the UE 700A has derived the direct communication key. The key means 704A may further comprise means for checking a MAC received from the device using the derived direct communication key and for generating a confirmation MAC using the direct communication key. The communication means 702A may further comprise means for sending the confirmation MAC with the first confirmation message; wherein, if the check is successful, the first confirmation message further indicates that the UE has successfully checked the MAC.

The device may comprise a UE-to-Network Relay and the key generation information may comprise Generic Bootstrapping Architecture Push Information, GPI.

In one example, the communication means 702A, key means 704A and discovery means 706A may be implemented with help from a computer program which, when run on a processor, causes the communication means 702A, key means 704A and discovery means 706A to cooperate to carry out examples of the method 100 as described above.

Figure 18:
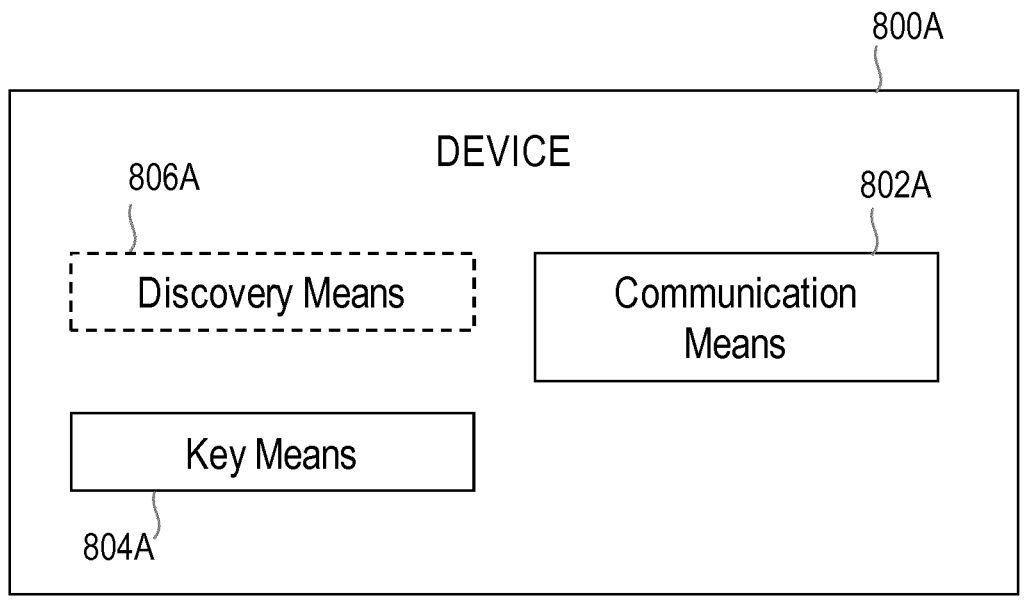
FIG. 18 is a block diagram illustrating another example of a device.

FIG. 18 illustrates functional units in another embodiment of device 800A which may execute the method 200 of the present invention, for example according to computer readable instructions received from a computer program. It will be understood that the units illustrated in FIG. 18 are software implemented functional units, and may be realised in any appropriate combination of software modules.

Referring to FIG. 18, the device 800A comprises communication means 802A for receiving from a UE an identifier of the UE and a request for key generation for direct communication with the device. The communication means 802A also comprise means for sending to a Direct Communication Element the UE identifier and an identifier of the device, and for requesting the Direct Communication Element to provide the device with a direct communication key. The communication means 802A also comprise means for receiving from the Direct Communication Element the direct communication key and key generation information, and for sending the key generation information and the device identifier to the UE. The device also comprises key means 804A for storing the direct communication key.

The Direct Communication Element may comprise at least one of a ProSe Function or a ProSe Key Management server, KMS.

The communication means 802A may further comprise means for receiving from the UE an identifier of the Direct Communication Element.

The device may further comprise discovery means 806A for discovering the UE through a discovery procedure. The communication means 802A may further comprise means for sending a discovery message to the UE, wherein the discovery message includes the identifier of the device and is assembled by the discovery means 806A.

The communication means 802A may further comprise means for receiving a discovery response message responding to the sent discovery message, and for passing the discovery response message to the discovery means 806A, the discovery response message including the identifier of the UE and the request for key generation for direct communication.

The key means 804A may further comprise means for generating a Message Authentication Code, MAC, using the direct communication key and the communication means 802A may further comprise means for sending the MAC to the UE with the key generation information and the device identifier.

The communication means 802A may further comprise means for receiving a first confirmation message from the UE indicating that the UE has derived the direct communication key. The first confirmation message may further indicate that the UE has successfully checked the MAC.

The communication means 802A may further comprise means for receiving a confirmation MAC with the first confirmation message, and for passing the MAC to the key means 804A. The key means 804A may further comprise means for checking the confirmation MAC using the direct communication key and, if the check is successful, the communication means 802A may further comprise means for sending a second confirmation message to the UE.

The device 800A may comprise a UE-to-Network Relay and the key generation information may comprise Generic Bootstrapping Architecture Push Information, GPI. In some examples, the communication means 802A, key means 804A and discovery means 806A may be implemented with help from a computer program which, when run on a processor, causes the communication means 802A, key means 804A and discovery means 806A to cooperate to carry out examples of the method 200 as described above.

Figure 19:
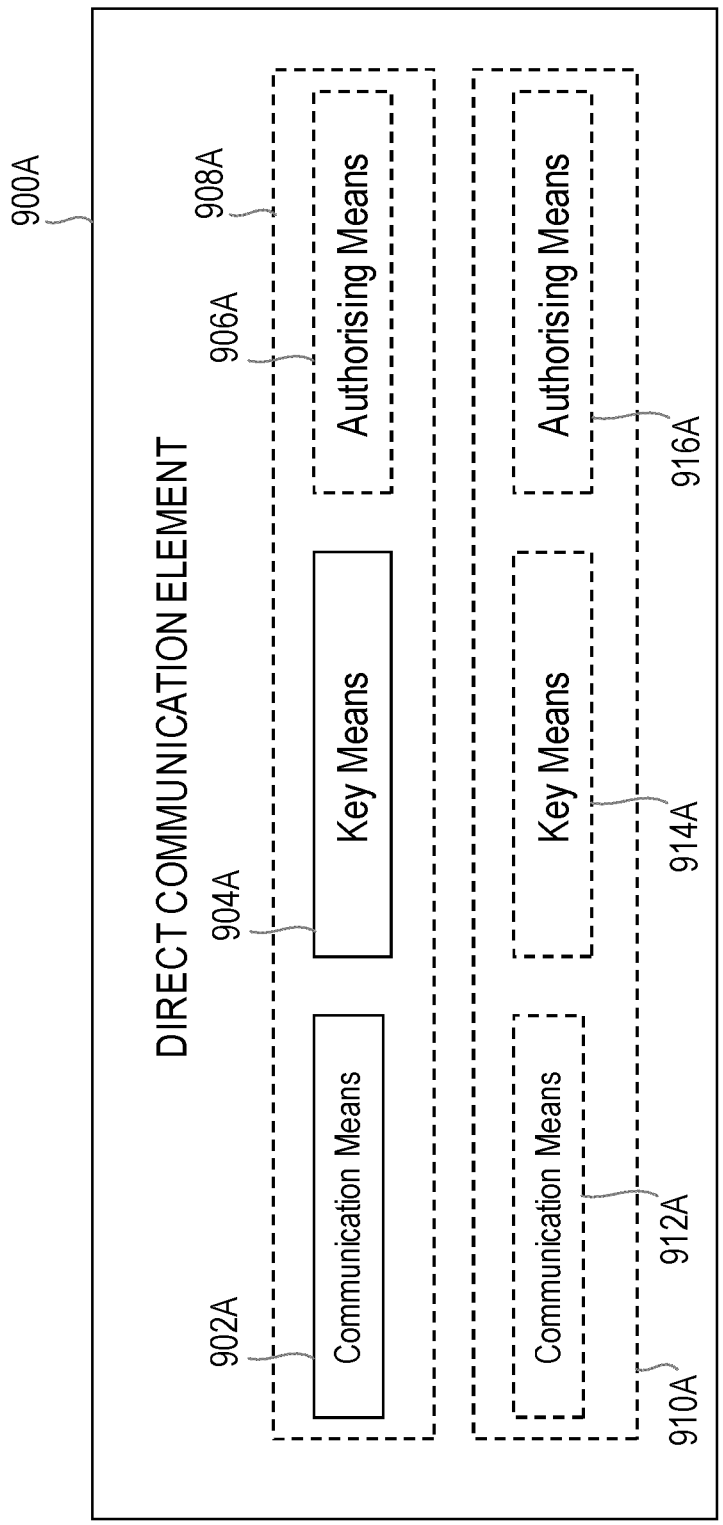
FIG. 19 is a block diagram illustrating another example of a Direct Communication Element.

FIG. 19 illustrates functional units in another embodiment of DCE 900A which may execute the method 300 of the present invention, for example according to computer readable instructions received from a computer program. It will be understood that the units illustrated in FIG. 19 are software implemented functional units, and may be realised in any appropriate combination of software modules.

Referring to FIG. 19, the DCE 900A comprises communication means 902A for receiving from a device an identifier of a UE, an identifier of the device and a request to provide a direct communication key to the device. The communication means 902A further comprise means for sending the UE identifier to a BSF associated with the UE and for requesting key generation information from the BSF. The communication means 902A also comprise means for receiving from the BSF a session shared key and key generation information. The DCE 900A also comprises key means 904A for deriving a direct communication key from at least the session shared key and the device identifier. The communication means 902A further comprises means for sending the direct communication key and the key generation information to the device.

The DCE 900A may comprise at least one of a ProSe Function or a ProSe Key Management Server. The device may comprise a UE-to-Network Relay. The key generation information may comprise Generic Bootstrapping Architecture Push Information, GPI. The DCE 900A may further comprise authorising means 906A for checking that at least one of the device or the UE is authorised to establish direct communication. The DCE may comprise means for mapping the received UE identifier to a public UE identifier and the communication means 902A may comprise means for sending the public UE identifier to the BSF.

The DCE 900A may comprise a first sub-Element 908A in a first communication network and a second sub-Element 910A in a second communication network. The first and second sub elements may each comprise communication means 902A, 912A, key means 904A, 914A and authorising means 906A, 916A.

The communication means 902A or 912A in one of the first or second sub-Elements 908A, 910A may comprise means for sending to and receiving from at least one of the BSF or the device by sending to and receiving from the communication means 902A or 912A in the other of the first or second sub-Elements 908A, 910A.

The authorising means 906A in the first sub-Element 908A may comprise means for authorising a first one of the UE or the device and the authorising means 916A in the second sub-Element 910A may comprise means for authorising a second one of the UE or the device.

In some examples, the communication means 902A, 912A, key means 904A, 914A and authorising means 906A, 916A may be implemented with help from a computer program which, when run on a processor, causes the communication means 902A, 912A, key means 904A, 914A and authorising means 906A, 916A to cooperate to carry out examples of the method 300 as described above.

Figure 20:
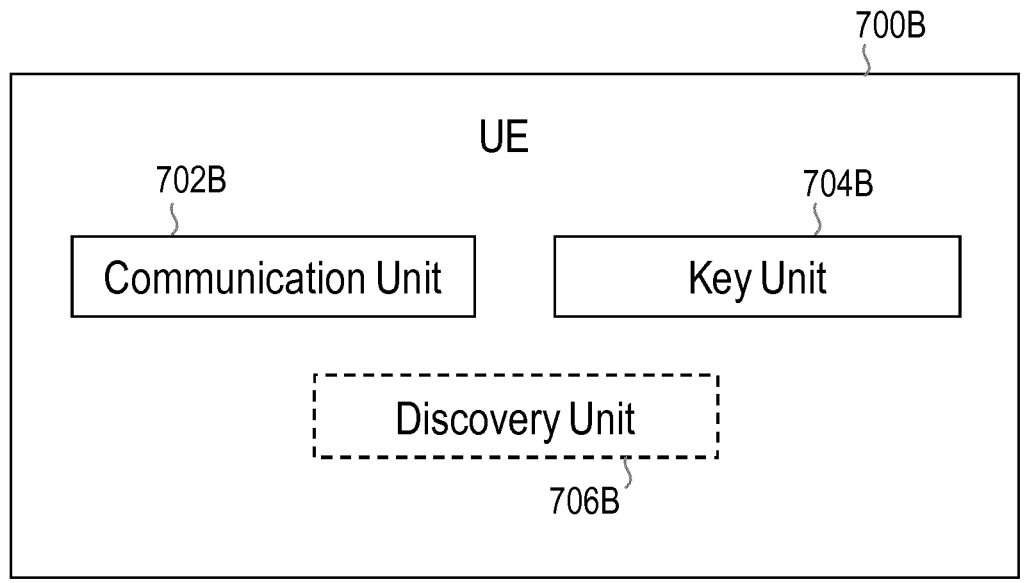
FIG. 20 is a block diagram illustrating another example of a UE.

FIG. 20 illustrates functional units in another embodiment of UE 700 which may execute the method 100, for example according to computer readable instructions received from a computer program. It will be understood that the units illustrated in FIG. 20 are hardware implemented functional units, and may be realised in any appropriate combination of hardware elements.

Referring to FIG. 20, the UE 700B comprises a communication unit 702B and a key unit 704B. The communication unit 702B is configured to send to a device an identifier of the UE 700B and to request key generation for direct communication with the device. The communication unit 702B is also configured to receive from the device a device identifier and key generation information. The key unit 704B is configured to derive a session shared key from at least the key generation information, and to derive a direct communication key from at least the session shared key and the identifier of the device.

The UE 700B may further comprise a discovery unit 706B configured to discover the device through a discovery procedure. The communication unit 702B may be configured to receive a discovery message from the device and pass the message to the discovery unit 704B, the discovery message including the identifier of the device. The communication unit may also be configured to send a discovery response message responding to the received discovery message, the discovery response message including identifier of the UE 700B and the request for key generation for direct communication and being assembled by the discovery unit 706B.

The communication unit 702B may be further configured to send a first confirmation message to the device indicating that the UE 700B has derived the direct communication key. The key unit 704B may be further configured to check a MAC received from the device using the derived direct communication key and to generate a confirmation MAC using the direct communication key. The communication unit may be configured to send the confirmation MAC with the first confirmation message; wherein, if the check is successful, the first confirmation message further indicates that the UE has successfully checked the MAC.

The device may comprise a UE-to-Network Relay and the key generation information may comprise Generic Bootstrapping Architecture Push Information, GPI.

Figure 21:
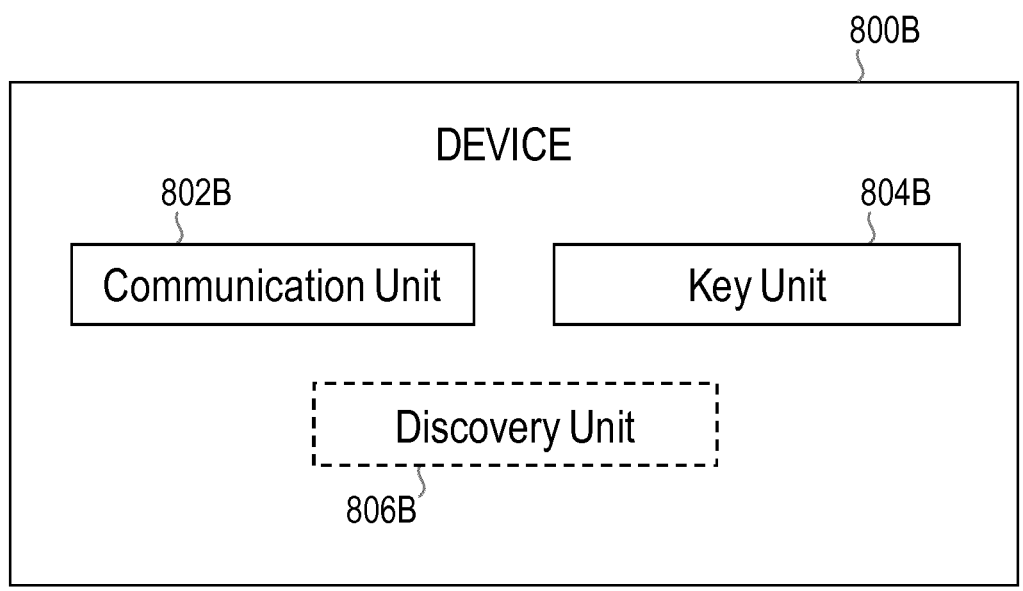
FIG. 21 is a block diagram illustrating another example of a device.

FIG. 21 illustrates functional units in another embodiment of device 800B which may execute the method 200 of the present invention, for example according to computer readable instructions received from a computer program. It will be understood that the units illustrated in FIG. 21 are hardware implemented functional units, and may be realised in any appropriate combination of hardware elements.

Referring to FIG. 21, the device 800B comprises a communication unit 802B and a key unit 804B. The communication unit 802B is configured to receive from a UE an identifier of the UE and a request for key generation for direct communication with the device. The communication unit 802B is also configured to send to a Direct Communication Element the UE identifier and an identifier of the device, and to request the Direct Communication Element to provide the device with a direct communication key. The communication unit 802B is also configured to receive from the Direct Communication Element the direct communication key and key generation information, to pass the direct communication key to the key unit 804B for storage and to send the key generation information and the device identifier to the UE.

The Direct Communication Element may comprise at least one of a ProSe Function or a ProSe Key Management server, KMS.

The communication unit 802B may be further configured to receive from the UE an identifier of the Direct Communication Element.

The device may further comprise a discovery unit 806B configured to discover the UE through a discovery procedure. The communication unit 802B may be further configured to send a discovery message to the UE, wherein the discovery message includes the identifier of the device and is assembled by the discovery unit 806B.

The communication unit 802B may be further configured to receive a discovery response message responding to the sent discovery message, and to pass the discovery response message to the discovery unit 806B, the discovery response message including the identifier of the UE and the request for key generation for direct communication.

The key unit 804B may be further configured to generate a Message Authentication Code, MAC, using the direct communication key and the communication unit 802 may be further configured to send the MAC to the UE with the key generation information and the device identifier.

The communication unit 802B may be further configured to receive a first confirmation message from the UE indicating that the UE has derived the direct communication key. The first confirmation message may further indicate that the UE has successfully checked the MAC.

The communication unit 802B may be further configured to receive a confirmation MAC with the first confirmation message, and to pass the MAC to the key unit 804B. The key unit 804B may be configured to check the confirmation MAC using the direct communication key and, if the check is successful, the communication unit 802B may be configured to send a second confirmation message to the UE.

The device 800B may comprise a UE-to-Network Relay and the key generation information may comprise Generic Bootstrapping Architecture Push Information, GPI.

Figure 22:
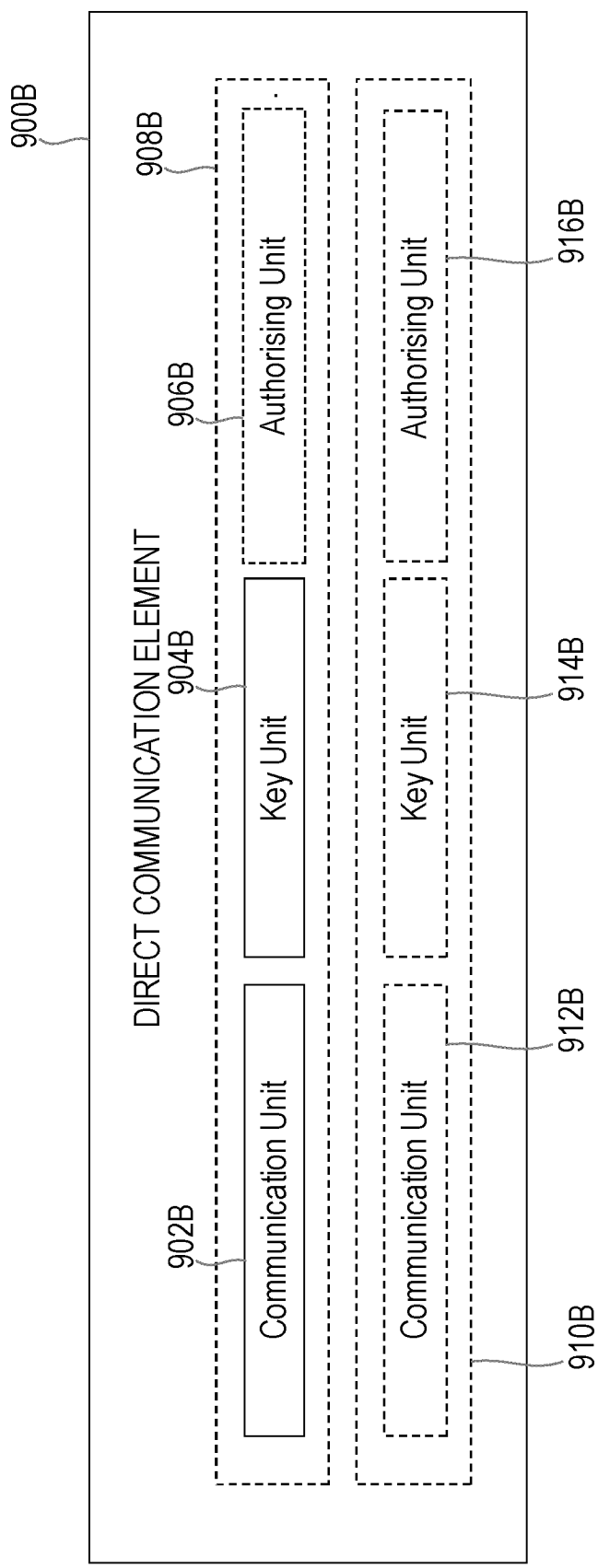
FIG. 22 is a block diagram illustrating another example of a Direct Communication Element.

FIG. 22 illustrates functional units in another embodiment of DCE 900B which may execute the method 300 of the present invention, for example according to computer readable instructions received from a computer program. It will be understood that the units illustrated in FIG. 22 are hardware implemented functional units, and may be realised in any appropriate combination of hardware elements.

Referring to FIG. 22, the DCE 900B comprises a communication unit 902B and a key unit 904B. The communication unit 902B is configured to receive from the device an identifier of a UE, an identifier of a device and a request to provide a direct communication key to the device. The communication unit 902B is also configured to send the UE identifier to a BSF associated with the UE and to request key generation information from the BSF. The communication unit 902B is also configured to receive from the BSF a session shared key and key generation information. The key unit 904B is configured to derive the direct communication key from at least the session shared key and the device identifier. The communication unit 902B is configured to send the direct communication key and the key generation information to the device.

The DCE 900B may comprise at least one of a ProSe Function or a ProSe Management Server. The device may comprise a UE-to-Network Relay. The key generation information may comprise Generic Bootstrapping Architecture Push Information, GPI. The DCE 900B may further comprise an authorising unit 906B configured to check that at least one of the device or the UE is authorised to establish direct communication. The DCE may be configured to map the received UE identifier to a public UE identifier and the communication unit 902B may be configured to send the public UE identifier to the BSF.

The DCE 900B may comprise a first sub-Element 908B in a first communication network and a second sub-Element 910B in a second communication network. The first and second sub elements may each comprise a communication unit 902B, 912B, a key unit 904B, 914B and an authorising unit 906B, 916B.

The communication unit 902B or 912B in one of the first or second sub-Elements 908B, 910B may be configured to send to and receive from at least one of the BSF or the device by sending to and receiving from the communication unit 902B or 912B in the other of the first or second sub-Elements 908B, 910B.

The authorising unit 906B in the first sub-Element 908B may be configured to authorise a first one of the UE or the device and the authorising unit 916B in the second sub-Element 910B may be configured to authorise a second one of the UE or the device.

Aspects of the present invention thus provide methods, apparatus, computer programs and a system enabling the establishment of a key for direct communication between a UE and a device. The key is established using GBA Push procedures and aspects of the present invention enable a shared key to be established between a UE and another device without the need for pre-configuring in the UE or device and without the need for network coverage for the UE.

The methods of the present invention may be implemented in hardware, or as software modules running on one or more processors. The methods may also be carried out according to the instructions of a computer program, and the present invention also provides a computer readable medium having stored thereon a program for carrying out any of the methods described herein. A computer program embodying the invention may be stored on a computer-readable medium, or it could, for example, be in the form of a signal such as a downloadable data signal provided from an Internet website, or it could be in any other form.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method performed by a user equipment (UE) for obtaining a key for direct communication with a device over an interface, the method comprising:
   sending to the device an identifier of the UE and requesting key generation for direct communication with the device;
   receiving from the device a Message Authentication Code (MAC) with a device identifier and key generation information;
   deriving a session shared key from at least the key generation information; and
   deriving a direct communication key from at least the session shared key and the identifier of the device, wherein the MAC is generated using the direct communication key.

2. The method as claimed in claim 1, wherein the interface comprises a Proximity Services, ProSe, interface.

3. The method as claimed in claim 1, further comprising discovering the device through a discovery procedure.

4. The method as claimed in claim 3, wherein at least one of the UE identifier, the device identifier or the request for key generation is comprised within a discovery procedure message.

5. The method as claimed in claim 1, further comprising receiving a discovery message from the device, wherein the discovery message includes the identifier of the device.

6. The method as claimed in claim 5, wherein sending the identifier of the UE and requesting key generation for direct communication with the device comprises sending a discovery response message responding to the received discovery message.

7. The method as claimed in claim 1, wherein the key generation information comprises Generic Bootstrapping Architecture Push Information.

8. A method performed by a device, for obtaining a key for direct communication with a user equipment (UE) over an interface, the method comprising:
receiving from the UE an identifier of the UE and a request for key generation for direct communication with the device;
sending to a Direct Communication Element the UE identifier and an identifier of the device, and requesting the Direct Communication Element to provide the device with a direct communication key;
receiving from the Direct Communication Element the direct communication key and key generation information; and
sending a Message Authentication Code (MAC) with the key generation information and the device identifier to the UE, wherein the MAC is generated using the direct communication key.

9. The method as claimed in claim 8, wherein the interface comprises a Proximity Services, ProSe, interface, and the Direct Communication Element comprises at least one of a ProSe Function or a ProSe Key Management server, KMS.

10. The method as claimed in claim 8, further comprising receiving from the UE an identifier of the Direct Communication Element.

11. The method as claimed in claim 8, further comprising discovering the UE through a discovery procedure.

12. The method as claimed in claim 11, wherein at least one of the UE identifier, the device identifier or the request for key generation is comprised within a discovery procedure message.

13. The method as claimed in claim 8, further comprising sending a discovery message to the UE, wherein the discovery message includes the identifier of the device.

14. The method as claimed in claim 13, wherein receiving from the UE an identifier of the UE and a request for key generation for direct communication with the device comprises receiving a discovery response message responding to the sent discovery message.

15. The method as claimed in claim 8, wherein the key generation information comprises Generic Bootstrapping Architecture Push Information.

16. A method performed by a Direct Communication Element, for establishing a key for direct communication over an interface between a user equipment (UE) and a device, the method comprising:
receiving from the device an identifier of the UE, an identifier of the device and a request to provide a direct communication key to the device;
sending the UE identifier to a Bootstrapping Server Function, BSF, associated with the UE and requesting key generation information from the BSF;
receiving from the BSF a session shared key and key generation information;
deriving the direct communication key from at least the session shared key and the device identifier, wherein the direct communication key is used to generate a Message Authentication Code (MAC), wherein the MAC is sent by the device to the UE with the key generation information and the device identifier; and
sending the direct communication key and the key generation information to the device.

17. The method as claimed in claim 16, wherein the interface comprises a Proximity Services (ProSe) interface, and the Direct Communication Element comprises at least one of a ProSe Function or a ProSe Management Server.

18. The method as claimed in claim 16, further comprising checking that at least one of the device or the UE is authorised to establish direct communication.

19. The method as claimed in claim 16, further comprising mapping the received UE identifier to a public UE identifier and sending the public UE identifier to the BSF.

20. The method as claimed in claim 16, wherein the device comprises a UE-to-Network Relay.

21. The method as claimed in claim 16, wherein the key generation information comprises Generic Bootstrapping Architecture Push Information.

22. A system for securing direct communication between a user equipment (UE) and a device over an interface, the system comprising:
a UE;
a device; and
a Direct Communication Element, wherein
the Direct Communication Element is configured to obtain a shared session key and Generic Bootstrapping Architecture Push Information, GPI, to derive a direct communication key from at least the shared session key, and to send the direct communication key and the GPI to the device,
the device is configured to send the GPI to the UE, and the UE is configured to derive the shared session key from at least the GPI and to derive the direct communication key from the shared session key, wherein the direct communication key is used to generate a Message Authentication Code (MAC), wherein the MAC is sent by the device to the UE with the key generation information and the device identifier.

* * * * *